US012297665B2

(12) United States Patent
Massey et al.

(10) Patent No.: US 12,297,665 B2
(45) Date of Patent: May 13, 2025

(54) TUBULAR EXIT DEVICE AND METHOD OF INSTALLATION

(71) Applicant: dormakaba USA Inc., Indianapolis, IN (US)

(72) Inventors: Curtis Massey, Odenton, MD (US); Chris Fessett, Geigertown, PA (US); Mandeep Singh, Kitchener (CA)

(73) Assignee: dormakaba USA Inc., Indianapolis, IN (US)

( * ) Notice: Subject to any disclaimer, the term of this patent is extended or adjusted under 35 U.S.C. 154(b) by 153 days.

(21) Appl. No.: 17/640,062

(22) PCT Filed: Oct. 28, 2019

(86) PCT No.: PCT/US2019/058291
§ 371 (c)(1),
(2) Date: Mar. 3, 2022

(87) PCT Pub. No.: WO2021/050091
PCT Pub. Date: Mar. 18, 2021

(65) Prior Publication Data
US 2022/0341221 A1 Oct. 27, 2022

Related U.S. Application Data

(60) Provisional application No. 62/900,085, filed on Sep. 13, 2019.

(51) Int. Cl.
*E05B 65/10* (2006.01)
*E05C 9/02* (2006.01)
*E05C 9/18* (2006.01)

(52) U.S. Cl.
CPC .......... *E05B 65/1053* (2013.01); *E05C 9/028* (2013.01); *E05C 9/1858* (2013.01)

(58) Field of Classification Search
CPC ......... Y10T 292/0823; Y10T 292/0808; Y10T 292/0834; Y10T 292/0836;
(Continued)

(56) References Cited

U.S. PATENT DOCUMENTS 670,585 A * 3/1901 Fowler .................. A47H 1/022
248/200.1
1,386,551 A * 8/1921 Bumbarger ............... E05C 3/14
292/195
(Continued)

FOREIGN PATENT DOCUMENTS

CA 2512888 A1 * 8/2004 ............... E05B 3/04
CA 2832778 A1 * 5/2014 ......... E05B 17/2034
(Continued)

OTHER PUBLICATIONS

Espacenet machine translation KR 20110000989 A description and claims Jan. 6, 2011 (Year: 2023).*
(Continued)

*Primary Examiner* — Nicholas L Foster
*Assistant Examiner* — Steven A Tullia
(74) *Attorney, Agent, or Firm* — Faegre Drinker Biddle & Reath LLP

(57) ABSTRACT

An exit device assembly for coupling to a door having a first side and second side. A first exit device may be coupled to the first side of the door. The first exit device may include a main tube extending from a first end to a second end and a first adjustment tube coupled to the first end of the main tube. The first adjustment tube may be axially adjustable relative to the main tube along a first adjustment axis. An actuator assembly may be supported within an interior of the main tube of the first exit device and may be moveable between a first position and a second position. A latchbolt may be coupled to the actuator assembly and may be
(Continued)

moveable between a retracted position and an extended position in which the latchbolt engages a latch.

30 Claims, 18 Drawing Sheets

(58) Field of Classification Search

CPC ......... Y10T 292/0837; Y10T 292/0838; Y10T 292/0839; Y10T 292/084; Y10T 292/0844; Y10T 292/0845; Y10T 292/0908; Y10T 292/0909; Y10T 292/091; Y10T 292/0976; Y10T 292/097; Y10T 292/0971; Y10T 292/0972; Y10T 292/0975; Y10T 292/0994; Y10T 292/0995; E05B 65/1053; E05B 65/0025; E05B 65/10; E05B 65/1006; E05B 65/1046; E05B 65/106; E05B 65/1073; E05B 65/1093; E05B 1/0038; E05C 9/028; E05C 9/1858; E05C 9/00; E05C 9/002; E05C 9/02; E05C 9/10; E05C 9/14; E05C 9/16; E05C 9/026; E05C 9/18; E05C 9/1825; E05C 9/1833; E05C 9/1841; E05C 9/185

See application file for complete search history.

(56) References Cited

U.S. PATENT DOCUMENTS 2,182,396 A 12/1939 Copp
2,261,652 A 11/1941 Mare
3,563,585 A * 2/1971 Welch ................. E05B 65/1066 292/234
3,765,198 A * 10/1973 Horgan, Jr. ......... E05B 65/1066 70/92
3,767,238 A * 10/1973 Zawadzki ........... E05B 65/1053 292/201
4,366,974 A * 1/1983 Horgan, Jr. ........... E05B 65/106 292/336.3
4,382,620 A 5/1983 Horgan
4,418,949 A * 12/1983 Horgan, Jr. ........... E05B 65/106 292/336.3
4,506,922 A * 3/1985 Horgan, Jr. ........... E05B 65/106 292/336.3
4,711,480 A 12/1987 Horgan
4,792,168 A * 12/1988 Kardosh ............. E05B 65/0888 292/288
4,895,399 A 1/1990 Horgan
4,895,471 A * 1/1990 Geltz ........................ F16B 7/14 403/109.8
5,154,454 A 10/1992 Hollaway
5,542,150 A * 8/1996 Tu ........................... E05B 65/52 16/113.1
5,615,918 A 4/1997 Ferrell
5,660,420 A * 8/1997 Smith ........................ E05C 9/20 292/DIG. 60
6,463,628 B1 * 10/2002 Yeh ....................... E05B 1/0015 292/DIG. 53
6,511,104 B1 * 1/2003 Horgan, Jr. ................ E05B 3/00 292/336.3
6,726,257 B2 * 4/2004 Horgan, Jr. ........... E05B 65/106 292/336.3
8,864,195 B2 * 10/2014 Sullivan .............. E05B 65/0888 292/DIG. 60
9,003,843 B2 * 4/2015 Header ................... E05B 1/003 70/95
10,111,524 B2 * 10/2018 Ruecker ................. A47B 96/00
10,190,334 B2 * 1/2019 Graham ..................... F16C 1/12
10,190,345 B2 * 1/2019 McCullough ......... E05C 19/188
10,704,298 B2 * 7/2020 Thompson .......... E05B 65/1046
11,118,378 B1 * 9/2021 Sprague .............. E05B 65/1006
11,214,996 B2 * 1/2022 Baker ................. E05B 65/0025
2003/0062725 A1 * 4/2003 Horgan, Jr. ........... E05B 65/106 292/92
2003/0084540 A1 * 5/2003 Mayfield ................... B62B 9/20 16/110.1
2004/0094973 A1 5/2004 Sprague
2005/0060844 A1 * 3/2005 Chiang ................. E05B 1/0015 16/412
2007/0227209 A1 * 10/2007 Massard ................... E05B 9/04 70/371
2008/0092606 A1 * 4/2008 Meekma ................... E05C 9/20 70/120
2009/0113955 A1 5/2009 Ambrass
2010/0117376 A1 5/2010 Shen
2014/0132009 A1 * 5/2014 Chiang ................... E05C 3/124 292/164
2017/0218662 A1 * 8/2017 Thompson ................ E05C 1/12
2019/0264467 A1 * 8/2019 Francesca ................. E05B 9/04
2020/0040601 A1 * 2/2020 Witherby ................ E05B 9/084

FOREIGN PATENT DOCUMENTS

CA 3081290 C * 12/2023 ......... E05B 65/0025
CH 325779 A * 12/1954 ............... E05B 3/10
CN 109579414 B * 8/2021 ........... E05B 1/0015
DE 4406104 A1 * 8/1995 ............... E05B 3/10
DE 202004019978 U1 * 7/2005 ........... E05B 1/0015
DE 202005016417 U1 * 1/2006 ........... E05C 9/1858
DE 202006016305 U1 * 1/2007 ............... E05B 1/00
DE 202009012250 U1 * 1/2010 ......... E05B 65/0025
DE 202014009328 U1 * 4/2016 ............... E05C 9/20
EP 2625988 A1 * 8/2013 ............. A47H 1/022
EP 3023563 A1 * 5/2016 ........... E05B 1/0015
EP 3550102 B1 * 11/2021 ......... E05B 47/0012
FR 2926714 A1 * 7/2009 ........... A47K 17/024
GB 2504264 A * 1/2014 ......... E05B 65/1013
KR 930002969 Y1 * 11/1990 ............... E05B 1/00
KR 20110000989 A * 6/2009 ........... E05B 1/0038
KR 930002968 Y1 * 9/2017 ........... E05B 1/0007

OTHER PUBLICATIONS

CN 109579414 B, Espacenet machine translation, description and claims, Sep. 29, 2017 (Year: 2024).*

International Preliminary Report on Patentability issued in PCT/US2109/058291, mailed Mar. 15, 2022.

International Search Report and Written Opinion issued in PCT/US2019/058291, mailed Apr. 1, 2020.

* cited by examiner

TUBULAR EXIT DEVICE AND METHOD OF INSTALLATION

CROSS-REFERENCE TO RELATED APPLICATIONS

This application is an International Application, which claims priority to U.S. Provisional Application No. 62/900,085, filed Sep. 13, 2019, titled TUBULAR EXIT DEVICE AND METHOD OF INSTALLATION, the entire contents of which are incorporated herein by reference.

FIELD

The present disclosure relates to door hardware and, in particular, to an exit device for coupling to a door.

BACKGROUND

Exit devices are known. Known exit devices can be coupled to a pivotably-operable door and include a vertical or horizontal portion configured to be grasped by an operator for transitioning the door from a closed position to an opened position. The vertical or horizontal portion may be operable to selectively transition the exit device from a latched configuration prohibiting an operator from opening the door to an unlatched configuration permitting the operator to open the door.

SUMMARY

In an exemplary embodiment of the present disclosure, an exit device for coupling to a door having a first side is disclosed. The exit device comprises a main tube extending from a first end to a second end and a first adjustment tube coupled to the first end of the main tube. The first adjustment tube is axially adjustable relative to the main tube along a first adjustment axis. The exit device further comprises an actuator assembly supported by the main tube and a latchbolt coupled to the actuator assembly and moveable between retracted position and an extended position in which an end of the latchbolt is spaced apart from a distal end of the first adjustment tube. The actuator assembly includes an actuator adapted to fixedly couple to the first side of the door, and the latchbolt is configured to engage a latch.

In another exemplary embodiment of the present disclosure, an actuator assembly for an actuatable exit device is disclosed. The actuator assembly comprises an actuator having a distal end with a curvilinear surface and a carriage supporting a roller on a pin. The roller engages the curvilinear surface of the actuator, and the carriage is moveable along an axis in a first direction and a second direction opposite the first direction and along the axis between a first position and second position. The actuator assembly further includes a first biasing member supported by the carriage and providing a biasing force against the carriage in the first direction.

In a further exemplary embodiment of the present disclosure, an exit device assembly for coupling to a door having a first side opposite a second side is disclosed. The exit device comprises a drive member positioned on the first side of the door and moveable between a first position and a second position and an actuator positioned on the second side of the door and operatively coupled to drive member through a circular aperture of the door. The actuator is moveable between a retracted position corresponding to the drive member in the first position and an extended position corresponding to the drive member in the second position.

In another exemplary embodiment of the present disclosure, a method of installing an exit device assembly is disclosed. The method comprises providing a door having a first side opposite a second side and machining a circular aperture in the door. The circular aperture extends from the first side to the second side. The method further comprises positioning a drive member on the first side of the door. The drive member is moveable between a first position and a second position. The method also comprises positioning an actuator on the second side of the door. The actuator is moveably between a retracted position and an extended position. The method further comprises operatively coupling the drive member to the actuator only through the aperture in the door.

In a further exemplary embodiment of the present disclosure, an exit device for coupling to a plurality of doors is disclosed. The exit device comprises a main tube extending from a first end to a second end and a first adjustment tube coupled to the first end of the main tube. The first adjustment tube is axially adjustable relative to the main tube along a first adjustment axis.

In another exemplary embodiment of the present disclosure, a method of installing an exit device on a door is disclosed. The method comprises providing a door having a plurality of mounting locations and providing an exit device. The exit device comprises a main tube extending from a first end to a second end and a first adjustment tube coupled to the first end of the main tube. The first adjustment tube is axially adjustable relative to the main tube along a first adjustment axis. The method further comprises mounting the main tube of the exit device at a first one of the plurality of mounting locations, axially adjusting the first adjustment tube along the first adjustment axis relative to the main tube of the exit device, and mounting the first adjustment tube at a second one of the plurality of mounting locations.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION OF THE DRAWINGS

Figure 1:
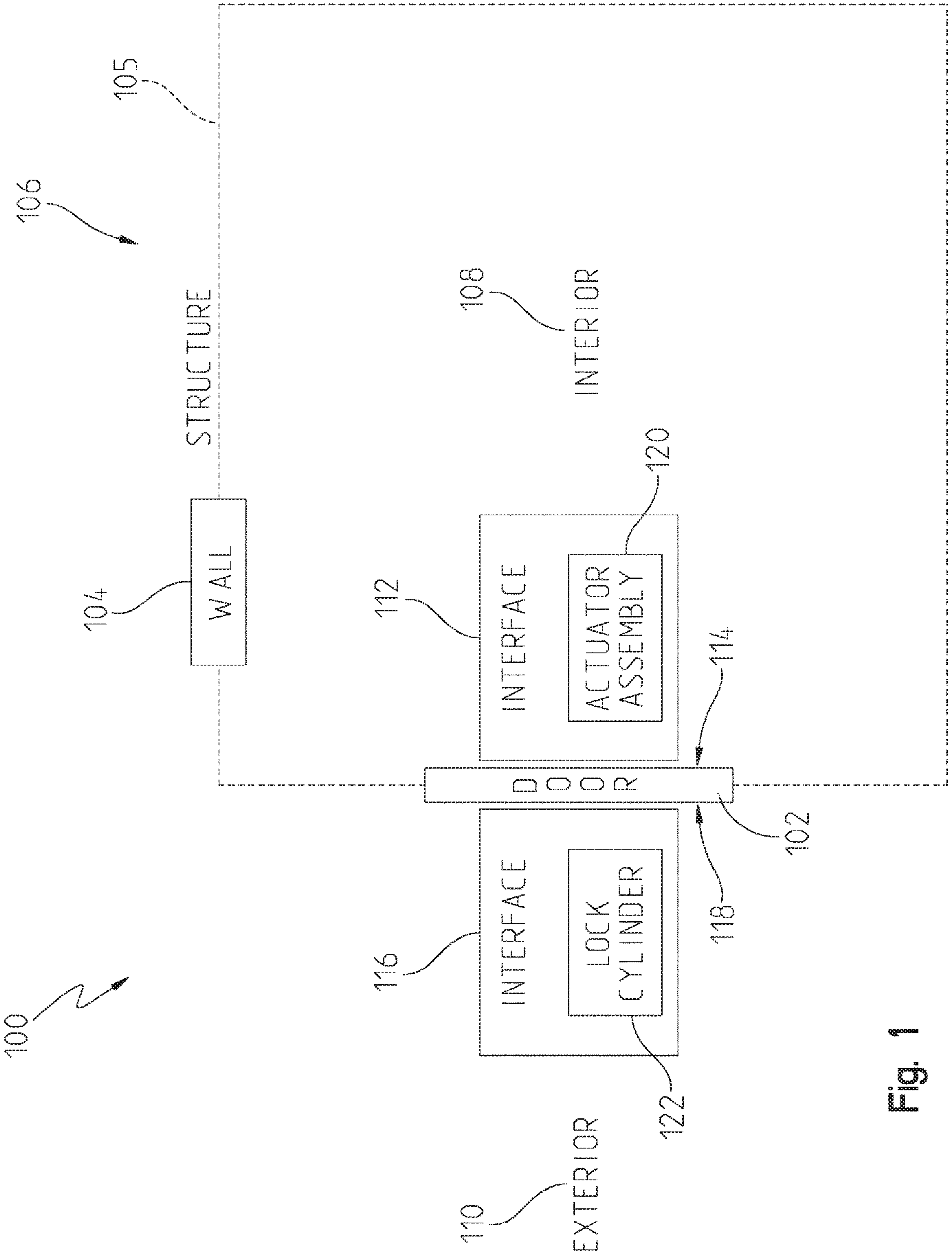
FIG. 1 is a schematic view of an exit device assembly coupled to a door, the door separating an interior of a structure and an exterior of the structure.

For the purposes of promoting an understanding of the principles of the present disclosure, reference is now made to the embodiments illustrated in the drawings, which are described below. The embodiments disclosed below are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

The terms “couples”, “coupled”, “coupler”, and variations thereof are used to include both arrangements wherein two or more components are in direct physical contact and arrangements wherein the two or more components are not in direct contact with each other (e.g., the components are “coupled” via at least a third component, but yet still cooperates or interact with each other).

In some instances throughout this disclosure and in the claims, numeric terminology, such as first, second, third, and fourth, is used in reference to various operative transmission components and other components and features. Such use is not intended to denote an ordering of the components. Rather, numeric terminology is used to assist the reader in identifying the component being referenced and should not be narrowly interpreted as providing a specific order of components.

Referring to FIG. 1, an exit device assembly 100 is represented. Exit device assembly 100 is coupled to a door 102 of a partition or wall 104 of a structure 106. Wall 104 defines a boundary 105 of structure 106, which delineates an interior 108 and an exterior 110 of structure 106. Door 102 provides an access point of structure 106 between interior 108 and exterior 110. Accordingly, door 102 is selectively moveable between a closed position in which access prohibited and an opened position (not shown) in which access to interior 108 from exterior 110 is permitted. Exemplary structures 106 include buildings, rooms, stores, offices, and other structures.

Exit device assembly 100 is operable to assist in transitioning door 102 between the closed and opened positions. Accordingly, exit device assembly 100 is operable between a latched position that corresponds to retaining door 102 in the closed position and an unlatched position that corresponds to allowing door 102 to be transitioned to the opened position. Exit device assembly 100 illustratively includes an interface 112 positioned on a first side 114 of door 102 and an interface 116 positioned on a second side 118 of door 102. In other embodiments, exit device assembly 100 includes only interface 112. In the exemplary embodiment shown, interface 112 and first side 114 of door 102 are facing interior 108 of structure 106, and interface 116 and second side 118 of door 102 are facing exterior 110 of structure 106. In other embodiments, interface 112 may be positioned within or face exterior 110 of structure 106, and interface 116 may be positioned within or face interior 108 of structure 106.

Illustratively, interface 112 is operatively coupled to door 102. More specifically, interface 112 is moveable between a rest state that corresponds to the latched position of exit device assembly 100 and an actuated state that corresponds to the unlatched position of exit device assembly 100. When interface 112 is in the rest state, exit device assembly 100 is in the latched position and door 102 is in the closed position. Conversely, when interface 112 in the actuated state, exit device assembly 100 is in the unlatched position and door 102 may be transitioned to the opened position. Accordingly, interface 112 of exit device assembly 100 allows movement from interior 108 to exterior 110 of structure 106. Interface 112 illustratively includes an actuator assembly 120 for transitioning door 102 between the closed and opened positions. Actuator assembly 120 is moveable between a first position and second position. In the exemplary embodiment shown, interface 112 is actuated toward first side 114 of door 102 to move actuator assembly 120 from the first position to the second position and transition exit device assembly 100 from the latched position to the unlatched position. When interface 112 returns to the rest state, actuator assembly 120 returns to the first position and transitions exit device assembly 100 from the unlatched position to the latched position. In the exemplary embodiment shown, actuator assembly 120 naturally resides in the first position. In other embodiments, interface 112 is actuated away from first side 114 or in another direction relative to the rest state to transition exit device assembly 100 from the latched position to the unlatched position.

In the exemplary embodiment shown, interface 116 is fixedly coupled to door 102. That is, interface 116 resides in a fixed state relative to door 102 and is not moveable toward or away from second side 118 of door 102. In other embodiments, interface 116 is moveable toward or away from second side 118 or in another translational or rotational direction. Interface 116, however, is operatively coupled to interface 112 to selectively transition exit device assembly 100 between the latched and unlatched positions. More specifically, interface 116 includes a lock cylinder 122 operatively coupled to actuator assembly 120 of interface 112. Lock cylinder 122 is selectively moveable between a first position and a second position that operatively engages actuator assembly 120 of interface 112 to transition exit device assembly 100 from the latched position to the unlatched position. When lock cylinder 122 transitions exit device assembly 100 to the unlatched position, door 102 is in the opened position. In the exemplary embodiment shown, lock cylinder 122 naturally resides in the first position. Accordingly, interface 116 of exit device assembly 100 allows selective movement from exterior 110 to interior 108 of structure 106. In other embodiments, lock cylinder 122 may be selectively maintained in the second position.

Figure 2:
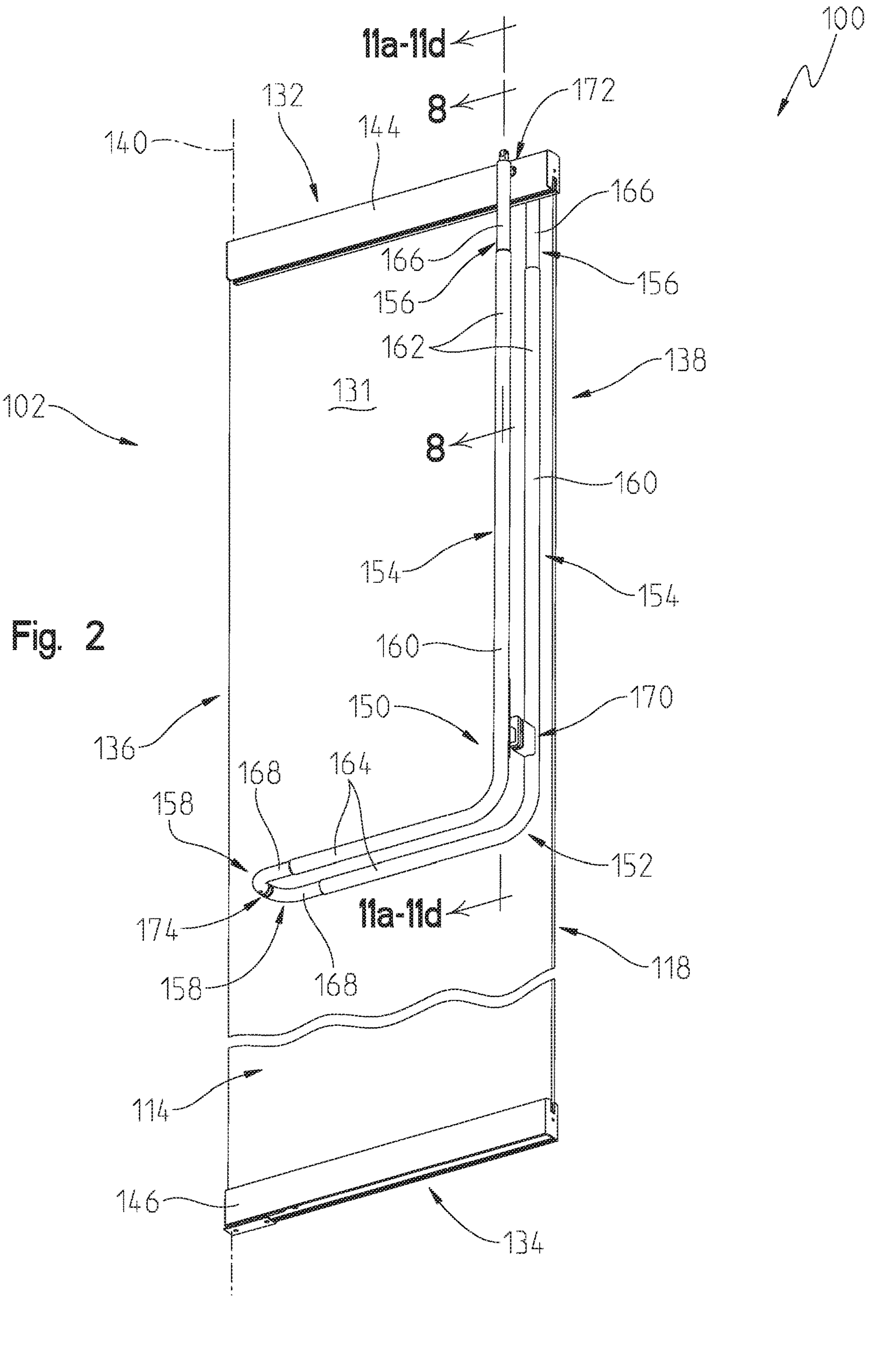
FIG. 2 is an interior perspective view of an exemplary exit device assembly coupled to a door.
Figure 3:
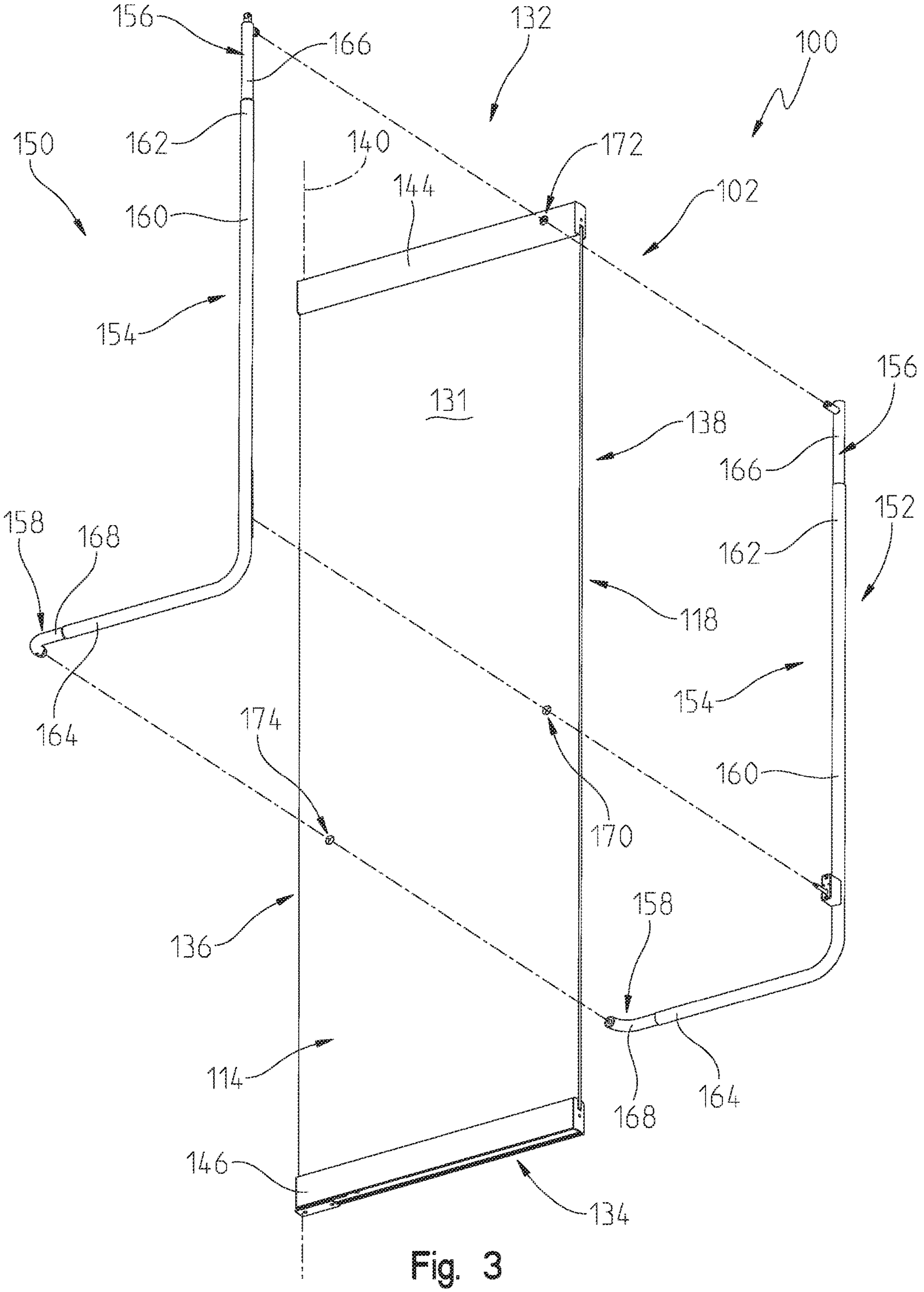
FIG. 3 is a partial exploded assembly view of the exemplary exit device assembly of FIG. 2.

Turning now to FIGS. 2 and 3, an exemplary exit device assembly 100 is coupled to door 102. Door 102 illustratively includes a body 131 having a top 132, a bottom 134 opposite top 132, a hinge end 136, and a latch end 138 opposite hinge end 136. In the exemplary embodiment shown, body 131 of door 102 comprises a transparent glass panel. In other embodiments, body 131 of door 102 comprises a semi-transparent or opaque glass panel, a metallic panel (e.g., steel, aluminum, stainless steel), a wood panel, a composite panel, or some combination thereof.

Hinge end 136 of door 102 is pivotally coupled to wall 104 along a hinge axis 140. Hinge end 136 may include one or more hinges rotatable about hinge axis 140. In other embodiments, hinge end 136 may not have any hinges and, instead, one or more hinges or pivots may be coupled to top 132 and bottom 134 of door 102. In the exemplary embodiment shown, an upper rail 144 is coupled to top 132 of door 102, and a lower rail 146 is coupled to bottom 134 of door 102. In one embodiment, stiles may be coupled to ends 136, 138 and rails 144, 146 to form a frame surrounding body 131 of door 102. In the exemplary embodiment shown, rails 144, 146 comprise a metallic material, such as, for example, steel, aluminum, or stainless steel. In other embodiments, rails 144, 146 may comprise wood, composite, or a combination of materials. In further embodiments, rails 144, 146 may comprise material dissimilar from the other of rails 144, 146 or the other components of door 102.

Exit device assembly 100 illustratively includes an actuable exit device 150 operatively coupled to first side 114 of door 102 and a fixed exit device 152 fixedly coupled to second side 118 of door 102 (see FIG. 3). Exit devices 150, 152 are exemplary embodiments of interfaces 112, 116. In the exemplary embodiment shown, exit devices 150, 152 comprise a main tube 154, a first adjustment tube 156, and a second adjustment tube 158. Main tube 154 illustratively comprises a tubular body 160 extending from a first end 162 to a second end 164. Similarly, each of adjustment tubes 156, 158 comprises a respective tubular body 166, 168. In addition, adjustment tube 156 of exit device 150 is threadably coupled to end 162 of main tube 154, and adjustment tube 158 is threadably coupled to end 164 of main tube 154. In the exemplary embodiment shown, main tube 154 and adjustment tubes 156, 158 comprise thin-walled tubing having a substantially hollow interior. In other embodiments, main tube 154 or adjustment tube 158 may comprise a generally solid rod or a tubing having a filled interior. In some embodiments, main tube 154 and adjustment tubes 156, 158 comprise a polygonal body. In the exemplary embodiment shown, exit devices 150, 152 couple to door 102 at a plurality of mounting locations. More specifically, main tube 154 couples to door 102 at a mounting location 170, adjustment tube 156 is coupled to door 102 at a mounting location 172, and adjustment tube 158 is coupled to door 102 at a mounting location 174.

Figure 4A:
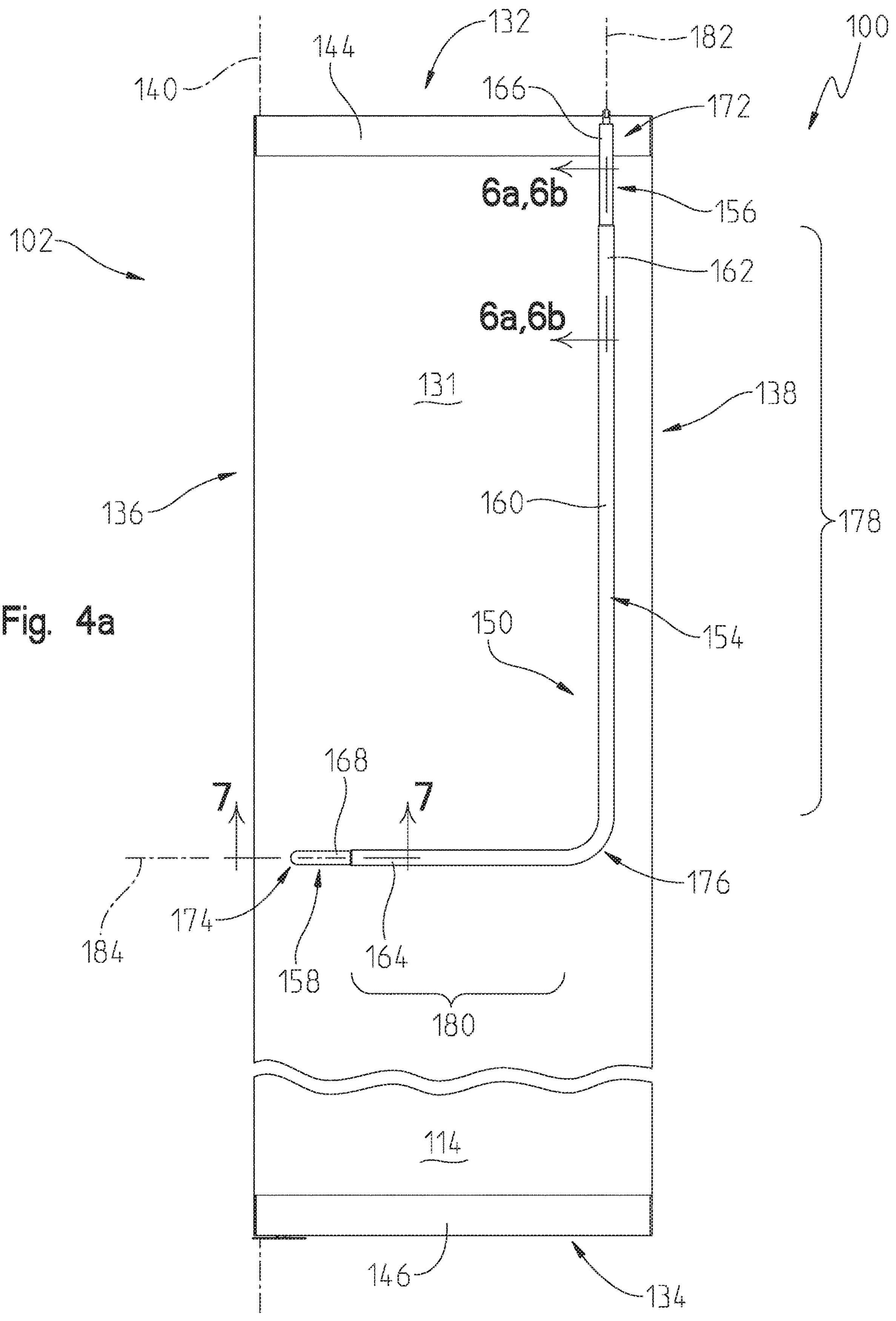
FIG. 4*a* is an interior view of the exemplary exit device assembly and door of FIG. 2 coupled to the door in a first configuration.
Figure 4B:
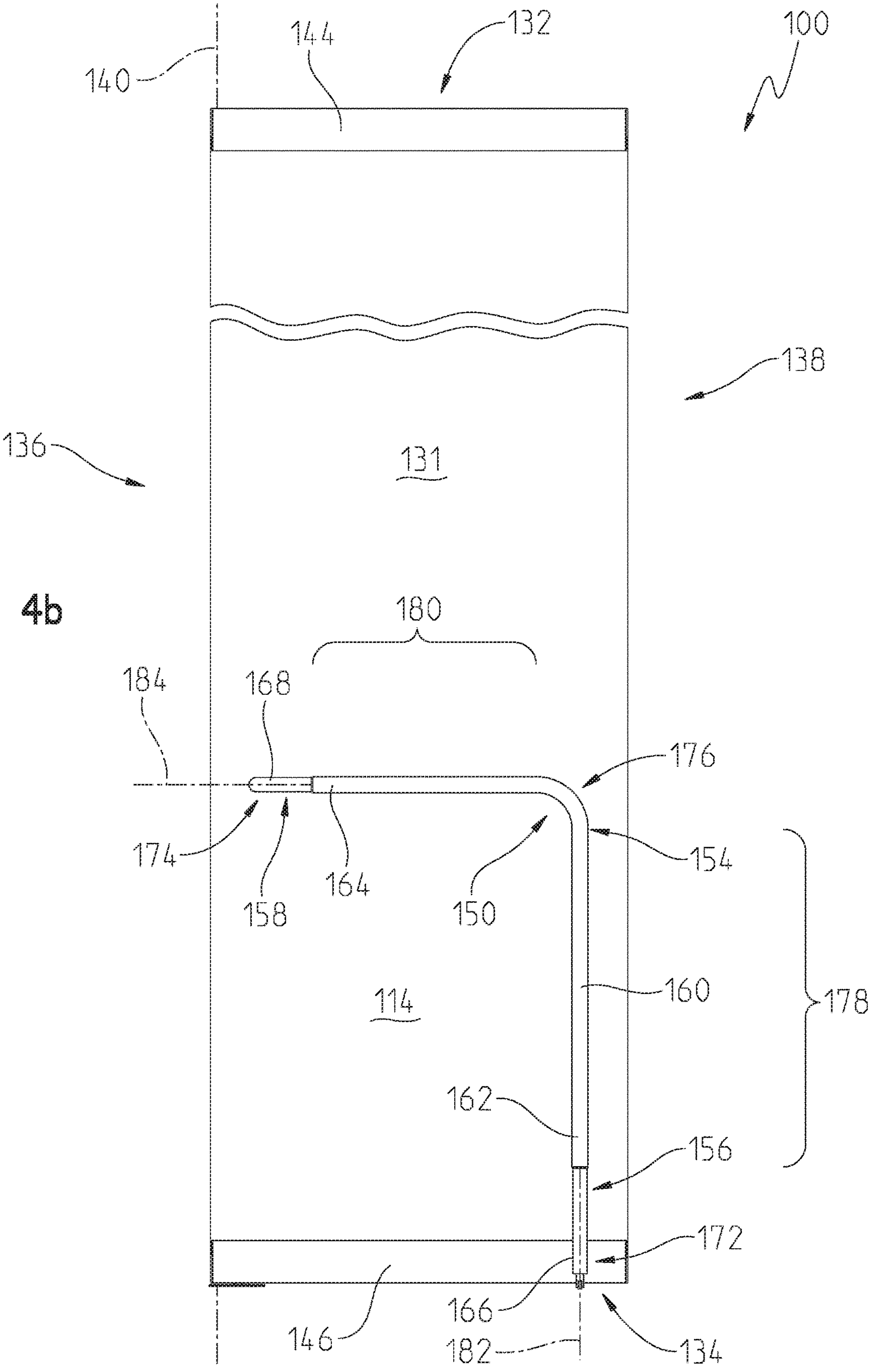
FIG. 4*b* is an interior view of the exemplary exit device assembly and door of FIG. 2 coupled to the door in a second configuration.
Figure 4C:
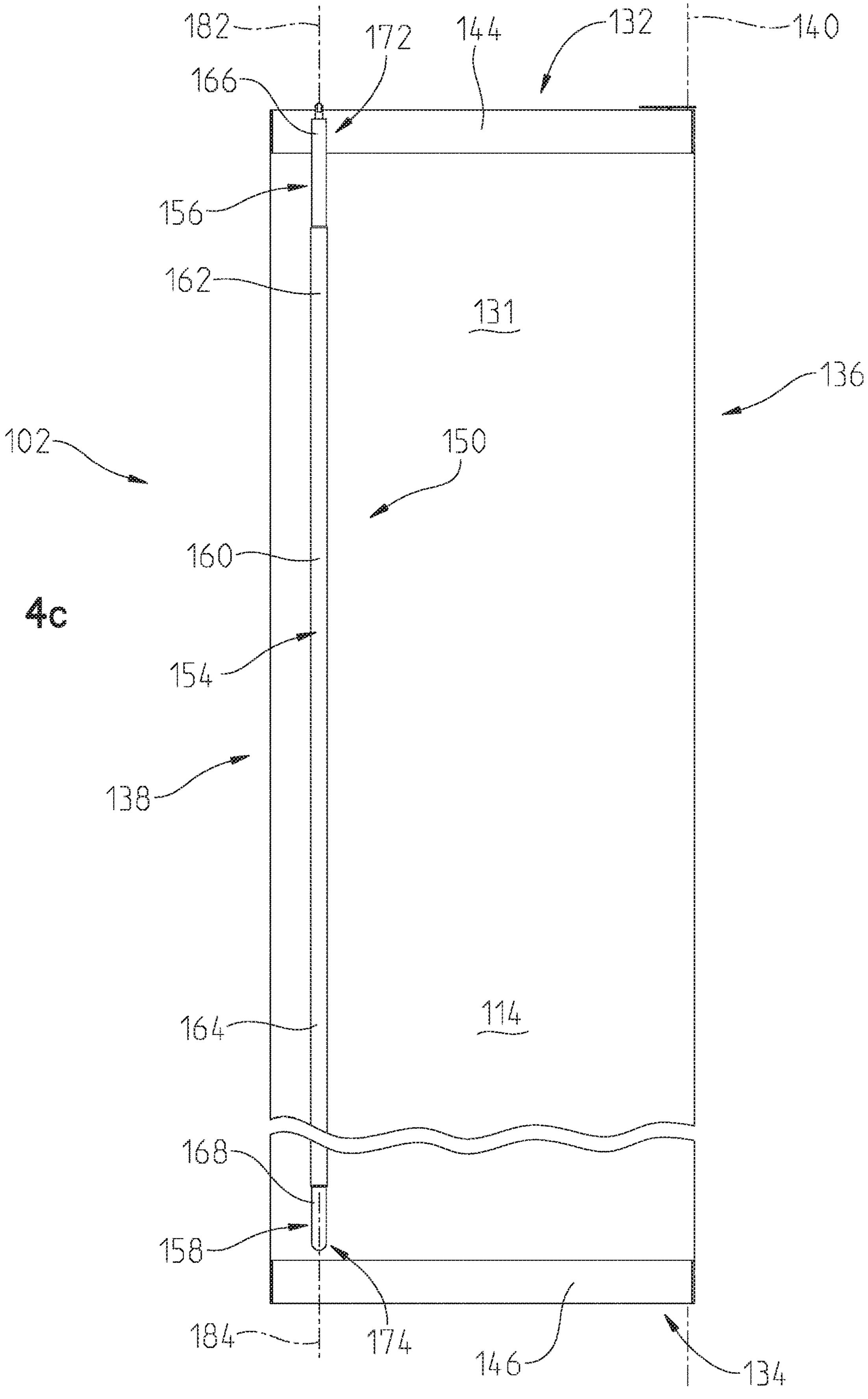
FIG. 4*c* is an interior view of the exemplary exit device assembly and door of FIG. 2 coupled to the door in a third configuration.

Turning now to FIGS. 4*a*-4*c*, exit devices 150, 152 may be coupled to door 102 in a variety of configurations that may depend upon, for example, the type of application, design considerations, aesthetics, and the desired security level.

Referring initially to FIG. 4*a*, exit device 150 is coupled to door 102 in a first configuration. More specifically, main tube 154 includes a bend 176, a vertical portion 178, and a horizontal portion 180. In the first configuration, horizontal portion 180 extends generally perpendicularly to vertical portion 178. Bend 176 is illustratively positioned vertically intermediate top 132 and bottom 134 of door 102. In the first configuration shown, bend 176 is positioned closer to bottom 134 than top 132 of door 102. In other embodiments, bend 176 may be positioned at various vertical locations intermediate top 132 and bottom 134 of door 102. Vertical portion 178 of main tube 154 is arranged parallel to and adjacent latch end 138 of door 102 and extends upwardly from bend 176 toward top 132 of door 102. Adjustment tube 156 is threadably coupled to first end 162 of vertical portion 178 of main tube 154 and axially aligned with vertical portion 178 of main tube 154. Horizontal portion 180 is arranged parallel to top 132 and bottom 134 of door 102 and extends horizontally from bend 176 toward hinge end 136. Adjustment tube 158 is threadably coupled to second end 164 of horizontal portion 180 of main tube 154 and axially aligned with horizontal portion 180 of main tube 154. In the first configuration, mounting location 170 is positioned vertically intermediate mounting locations 172, 174 and is vertically aligned with mounting location 172.

Referring now to FIG. 4*b*, exit device 150 is coupled to door 102 in a second configuration. More specifically, vertical portion 178 of main tube 154 extends downwardly from bend 176 toward bottom 134 of door 102. Adjustment tube 156 is threadably coupled to first end 162 of vertical portion 178 of main tube 154 and axially aligned with vertical portion 178 of main tube 154. Horizontal portion 180 is arranged parallel to top 132 and bottom 134 of door 102 and extends horizontally from bend 176 toward hinge end 136. Adjustment tube 158 is threadably coupled to second end 164 of horizontal portion 180 of main tube 154 and is axially aligned with horizontal portion 180 of main tube 154.

Referring now to FIG. 4*c*, exit device 150 is coupled to door 102 in a third configuration. More specifically, main tube 154 extends vertically from proximate bottom 134 of door 102 to top 132 of door 102. In the exemplary embodiment shown, main tube 154 is positioned parallel to and adjacent latch end 138 of door 102. Adjustment tube 156 is threadably coupled to first end 162 of main tube 154, and adjustment tube 158 is threadably coupled to second end 164. Each of adjustments tubes 156, 158 is axially aligned with main tube 154.

FIGS. 4*a*-4*c* illustrate exemplary configurations of exit device 150. In other embodiments, other configurations of exit device 150 may be used. In addition, when exit device assembly 100 includes exit device 152, exit device 152 may mirror the configuration of exit device 150 or comprise another one of the configurations illustrated in FIGS. 4*a*-4*c*.

Figure 5A:
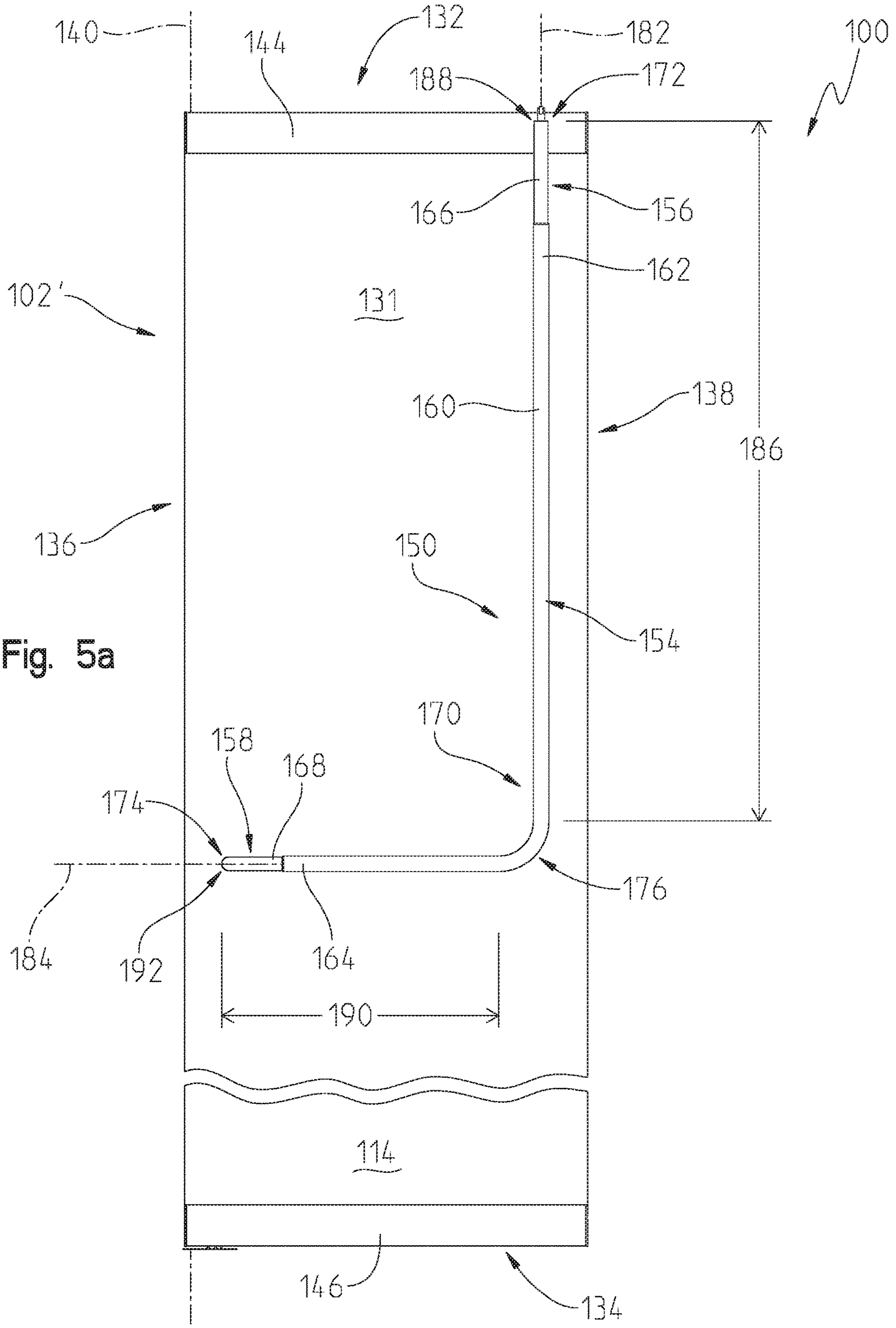
FIG. 5*a* is the exemplary exit device assembly of FIG. 2 coupled to a door having a first height and a first width.
Figure 5B:
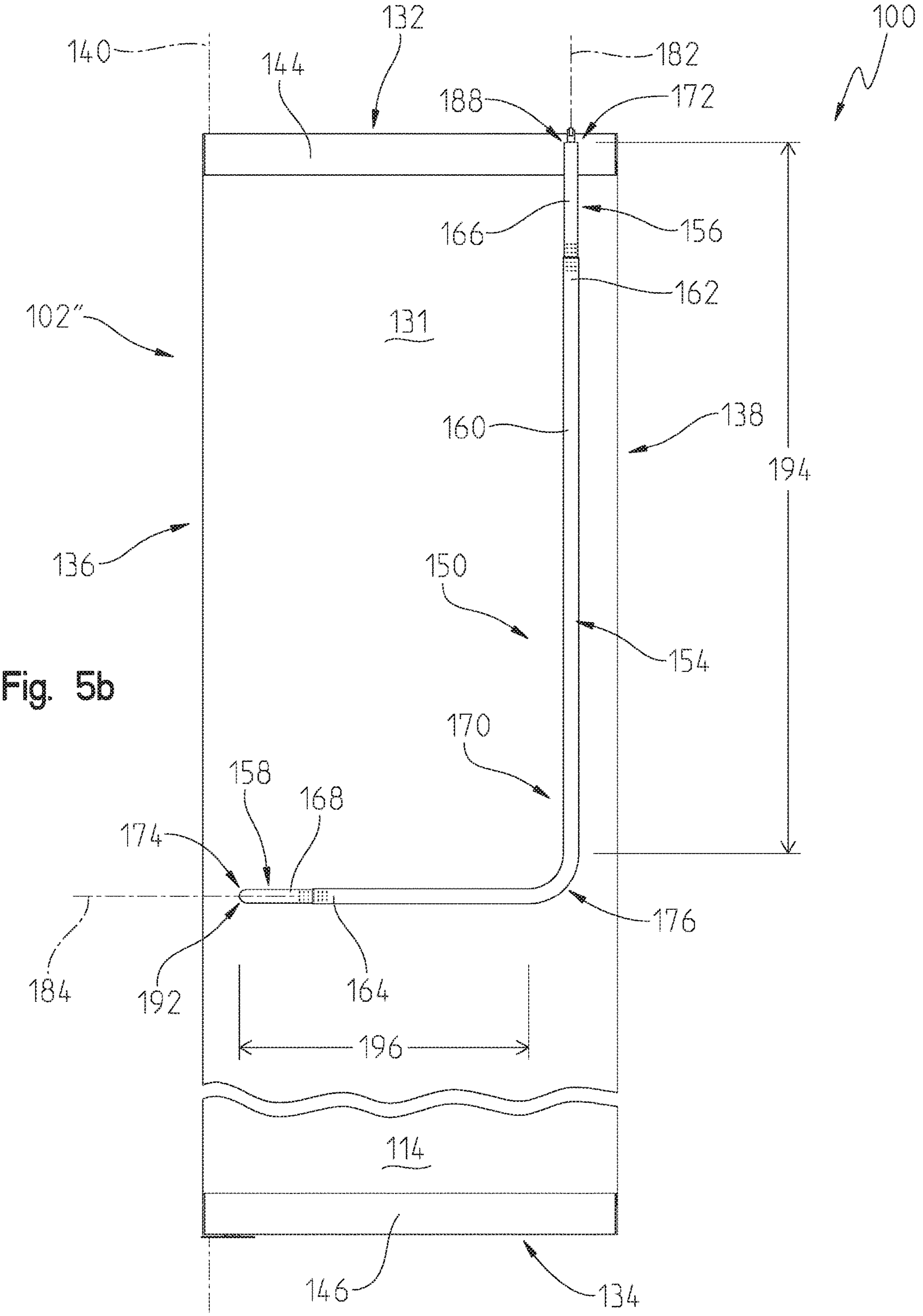
FIG. 5*b* is the exemplary exit device assembly of FIG. 2 coupled to a door having a second height and a second width larger than the first height and the first width of the door of FIG. 5*a;*

With reference now to FIGS. 5*a* and 5*b*, exit devices 150, 152 are independently adjustable to fit a plurality of doors 102, specifically doors 102', 102", having different dimensions. That is, adjustments tubes 156, 158 are axially adjustable relative to main tube 154 to change the dimensions of exit devices 150, 152 to fit a plurality of doors 102 having different dimensions. In the exemplary embodiment shown, adjustment tube 156 is axially adjustable along an adjustment axis 182 between a first position in which adjustment tube 156 is inserted within first end 162 of main tube 154 (see FIG. 6*a*) and a second position in which adjustment tube 156 is extended from first end 162 of main tube 154 (see FIG. 6*b*). Similarly, adjustment tube 158 is axially adjustable along an adjustment axis 184 between a first position in which adjustment tube 158 is inserted within second end 164 of main tube 154 and a second position in which adjustment tube 158 is extended from second end 164 of main tube 154. When exit devices 150, 152 are in the first and second configurations, adjustment axes 182, 184 are generally perpendicular to one another. Conversely, when exit devices 150, 152 are in the third configuration, adjustment axes 182, 184 are aligned with one another.

In FIG. 5*a*, exit device 150 is mounted on door 102' and includes a dimension 186 extending from bend 176 to a distal end 188 of adjustment tube 156. In the exemplary embodiment shown, dimension 186 corresponds to a vertical dimension of exit device 150, specifically a vertical dimension of exit device 150 when adjustment tube 156 is inserted within first end 162 of main tube 154, and distal end 188 of adjustment tube 156 corresponds to mounting location 172 of door 102'. Exit device 150 also includes a dimension 190 extending from bend 176 to a distal end 192 of adjustment tube 158. In the exemplary embodiment shown, dimension 190 corresponds to a horizontal dimension of exit device 150, specifically a horizontal dimension of exit device 150 when adjustment tube 158 is inserted within second end 164 of main tube 154, and distal end 192 of adjustment tube 158 corresponds to mounting location 174 of door 102'. In the first configuration of exit device 150, bend 176 acts as a datum for main tube 154.

In FIG. 5*b*, exit device 150 is mounted on door 102", which is larger than door 102'. More specifically, at least one of a height and a width of door 102" is larger than a respective one of a height and a width of door 102'. Exit device 150 includes a dimension 194 extending from bend 176 to distal end 188 of adjustment tube 156. In the exemplary embodiment shown, dimension 194 corresponds to a vertical dimension of exit device 150, specifically a vertical dimension of exit device 150 when adjustment tube 156 is extended from first end 162 of main tube 154, and distal end 188 corresponds to mounting location 172 of door 102". Accordingly, dimension 194 is larger than dimension 186. Exit device 150 also includes a dimension 196 extending from bend 176 to distal end 192 of adjustment tube 158. In the exemplary embodiment shown, dimension 196 corresponds to a horizontal dimension of exit device 150, specifically a horizontal dimension of exit device 150 when adjustment tube 158 is extended from second end 164 of main tube 154, and distal end 192 of adjustment tube 158 corresponds to mounting location 174 of door 102". Accordingly, dimension 196 is larger than dimension 190.

Adjustment tubes 156, 158 permit exit devices 150, 152 to be resized for doors having different dimensions. Therefore, an advantage, among others, is that exit devices 150, 152 do not need to be sized for a specific door having a specific dimension nor are differently sized exit devices required for each set of dimensions of doors. Another advantage, among others, of adjustment tubes 156, 158 is that exit devices 150, 152 may be adjusted for variances in the distances between mountings locations 170, 172, 174 over the intended distance therebetween. Adjustment tubes 156, 158 also permit adjustment of exit devices 150, 152 when misalignment inadvertently occurs between exit devices 150, 152 and mounting locations 170, 172, 174.

Figure 6A:
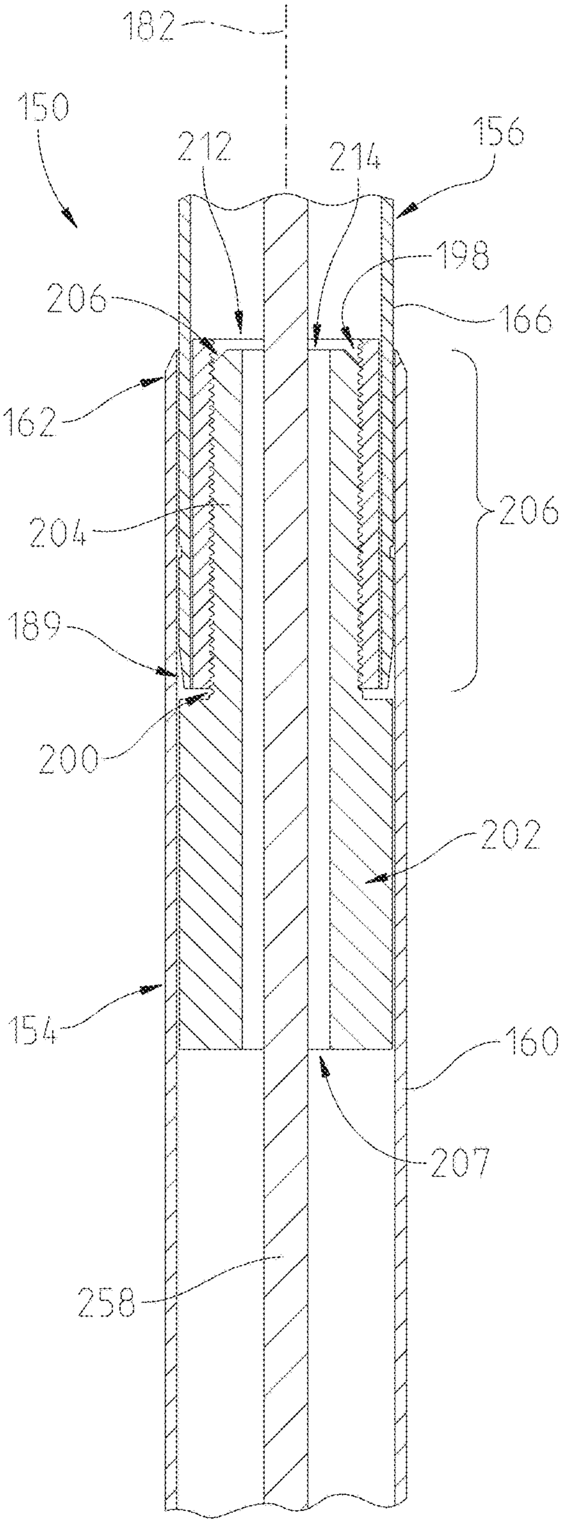
FIG. 6*a* is a cross-sectional view of an adjustment tube inserted into a main tube of the exemplary exit device assembly of FIG. 2 taken along lines 6*a,b*-6*a,b* of FIG. 4*a;*
Figure 6B:
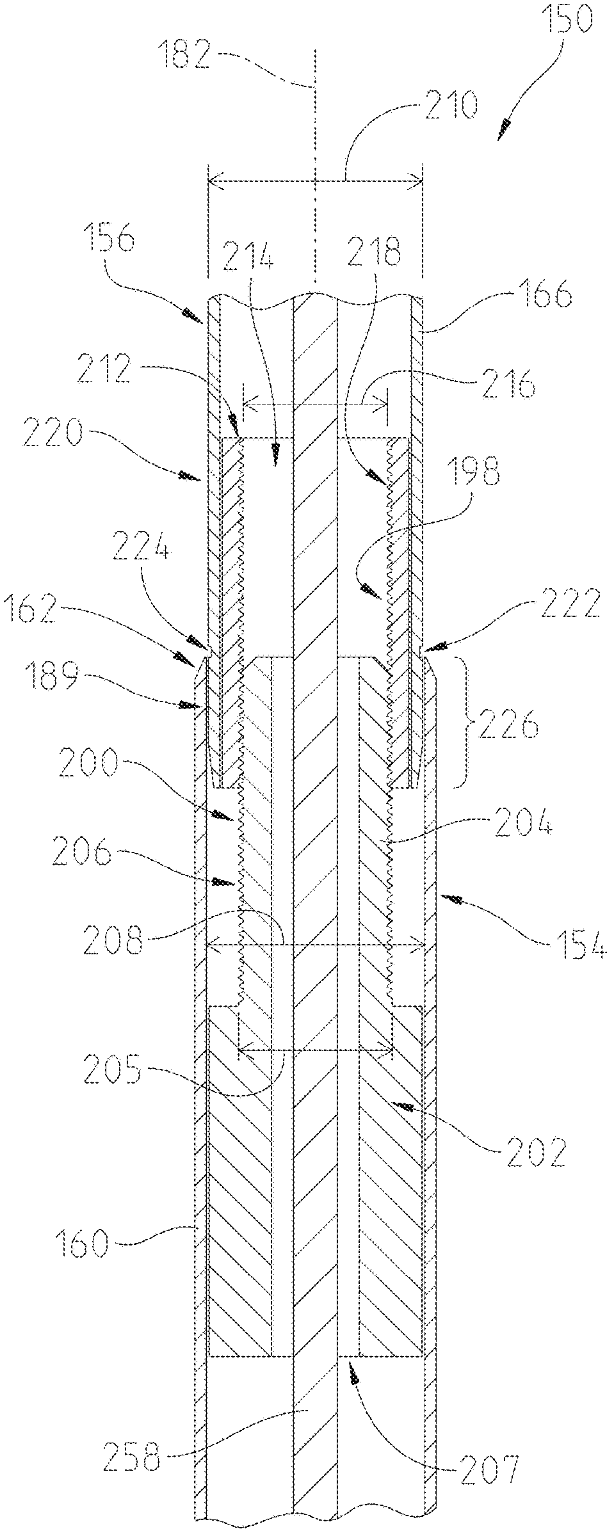
FIG. 6*b* is a cross-sectional view of the adjustment tube extended from the main tube of the exemplary exit device assembly of FIG. 2 taken along lines 6*a,b*-6*a,b* of FIG. 4*a;*

In the exemplary embodiment shown, adjustment tubes 156, 158 are continuously axially adjustable along the respective one of adjustment axes 182, 184 between the inserted position (see FIG. 6*a* for adjustment tube 156 and adjustment axis 182) and the extended position (see FIG. 6*b* for adjustment tube 156 and adjustment axis 182). That is, adjustment tubes 156, 158 include engagement features configured to engage complementary engagement features of main tube 154. Specifically, adjustment tube 156 includes engagement features 198 on an end 189 opposite distal end 188 configured to engage complementary engagement features 200 of main tube 154, as shown in FIGS. 6*a* and 6*b*. Similarly, adjustment tube 158 includes engagement features on an end opposite distal end 192 configured to engage complementary engagement features 200 of main tube 154. As such, each of first and second ends 162, 164 of main tube 154 includes engagement features 200.

As shown in FIGS. 6*a* and 6*b*, engagement features 198, 200 comprise complementary threading. Because adjustment tubes 156, 158 are received internally within main tube 154, engagement features 200 are arranged internally within tubular body 160 of main tube 154. At each of ends 162, 164, main tube 154 includes an adapter 202 within tubular body 160. Illustratively, adapter 202 is fitted within tubular body 160 of main tube 154. In other embodiments, adapter 202 may be integrally formed with tubular body 160. Adapter 202 includes a shaft 204 extending distally toward a respective one of ends 162, 164. Engagement features 200 are formed on an outer surface 206 of shaft 204. An outer diameter 205 of shaft 204 is sized smaller than an inner diameter 208 of tubular body 160 of main tube 154 to receive a respective one of adjustment tubes 156, 158. To that end, an outer diameter 210 of adjustment tubes 156, 158 is smaller than inner diameter 208 of main tube 154. Adapter 212 also includes a central opening 207 axially aligned with adjustment axes 182, 184.

Respective ends 189, 193 of adjustment tubes 156, 158 likewise include an adapter 212 within tubular bodies 166, 168. In the exemplary embodiment shown, adapter 212 is fitted within tubular bodies 166, 168. In other embodiments, adapter 212 may be integrally formed with tubular bodies 166, 168. Adapter 212 includes a central opening 214 having an inner diameter 216 that corresponds to outer diameter 205 of shaft 204 of adapter 202. To that end, engagement features 198 are formed on an inner wall 218 of adapter 212. In other embodiments, adjustment tubes 156, 158 may be discretely axially adjustable along the respective one of adjustment axes 182, 184. For example, adjustment tubes 156, 158 may engage main tube 154 with a locking telescoping mechanism or an indexed, locking telescoping mechanism. In other embodiments, adjustment tubes 156, 158 may engage main tube 154 with axial splines and be axially maintained using, for example, a set screw.

In the exemplary embodiment shown, an outer surface 220 of end 189 of adjustment tube 156 and an outer surface of the end of adjustment tube 158 includes a visual indicator 222, illustratively a circumferential groove 224. Visual indicator 222 may indicate to a user, such as an installer, a position of a respective one of adjustment tubes 156, 158 relative to the inserted position of FIG. 6*a* and the extended position of FIG. 6*b*. To this end, visual indicator 222 may indicate a minimum overlap of engagement features 198, 200 and, therefore, the extended position of adjustment tubes 156, 158 relative to main tube 154. In other embodiments, visual indicator 222 may comprise a label, an illustration, or a color. In some embodiments, exit devices 150, 152 may include a set screw or other locking mechanism configured to limit travel of adjustment tubes 156, 158 relative to main tube 154 or maintain an amount of overlap 226 of adjustment tubes 156, 158 relative to main tube 154 once the axial position of adjustment tubes 156, 158 has been set.

Figure 7:
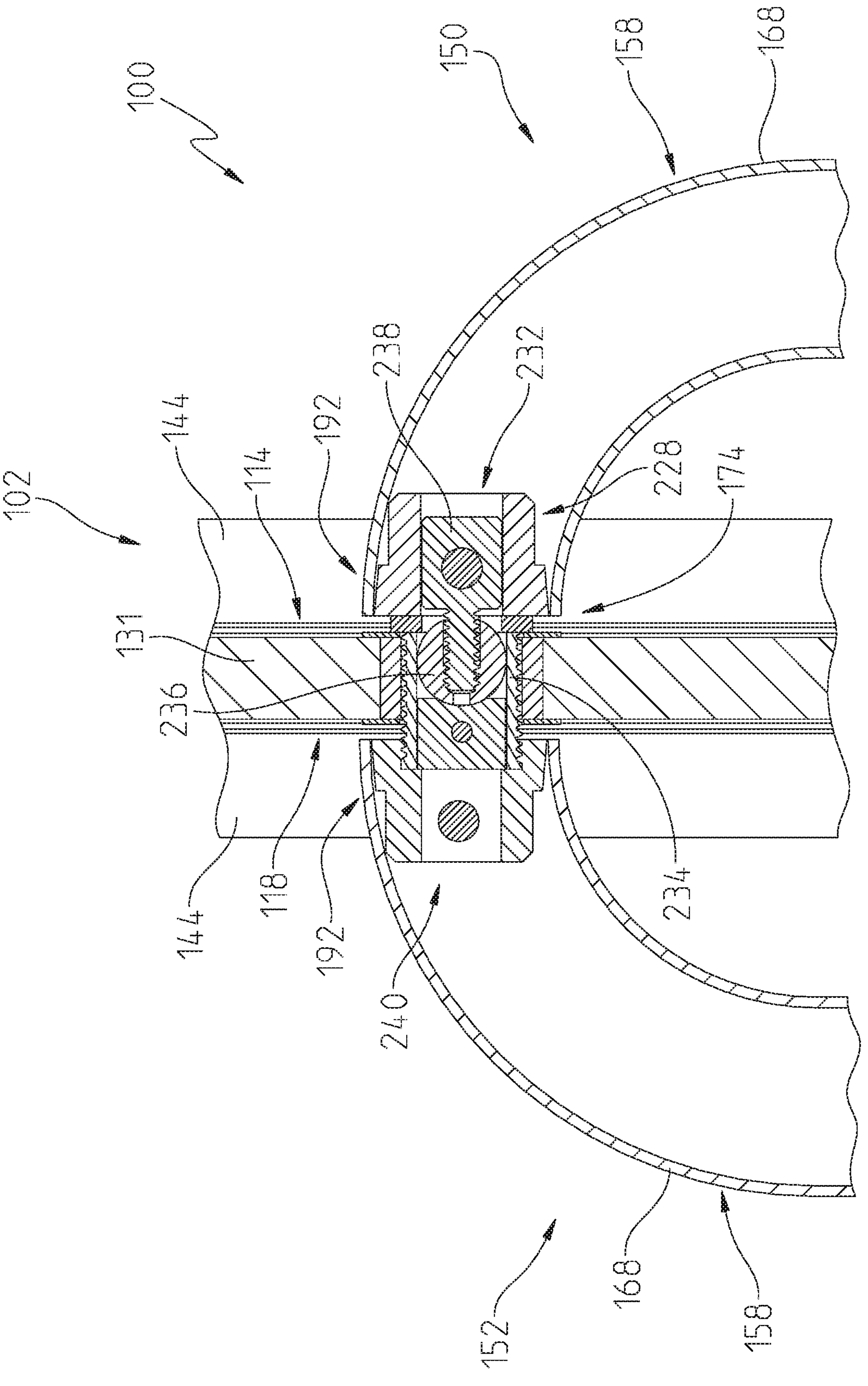
FIG. 7 is a cross-sectional view of a return tube of a horizontal section of the exemplary exit device assembly of FIG. 2 taken along lines 7-7 of FIG. 4*a;*

Turning now to FIG. 7, distal end 192 of adjustment tube 158 is shown in more detail. In the first configuration of exit devices 150, 152, distal end 192 of adjustment tube 158 comprises a decorative return, illustratively a bend or curve, of adjustment tube 158 into door 102. In other embodiments, distal end 192 of adjustment tube 158 may comprise another style of termination of exit devices 150, 152. In the exemplary embodiment shown, exit device 150 is pivotally coupled to door 102 at mounting location 174. More specifically, distal end 192 of adjustment tube 158 of exit device 150 includes an adapter 228 coupled to a pivot coupler 232 pivotally supported within a socket 234 coupled to door 102. In the exemplary embodiment shown, pivot coupler 232 includes a ball joint 236 pivotally supported within socket 234 and threadably coupled to a pin 238. Pin 238 is coupled to adapter 228. Pivot coupler 232 permits adjustment tube 158 and main tube 154 to pivot relative to mounting location 172 when exit device 150 is actuated towards or away from door 102. Conversely, exit device 152 is fixedly coupled to door 102 at mounting location 174. Distal end 192 of adjustment tube 158 of exit device 152 includes an adapter 240 fixedly coupled to socket 234.

Figure 8:
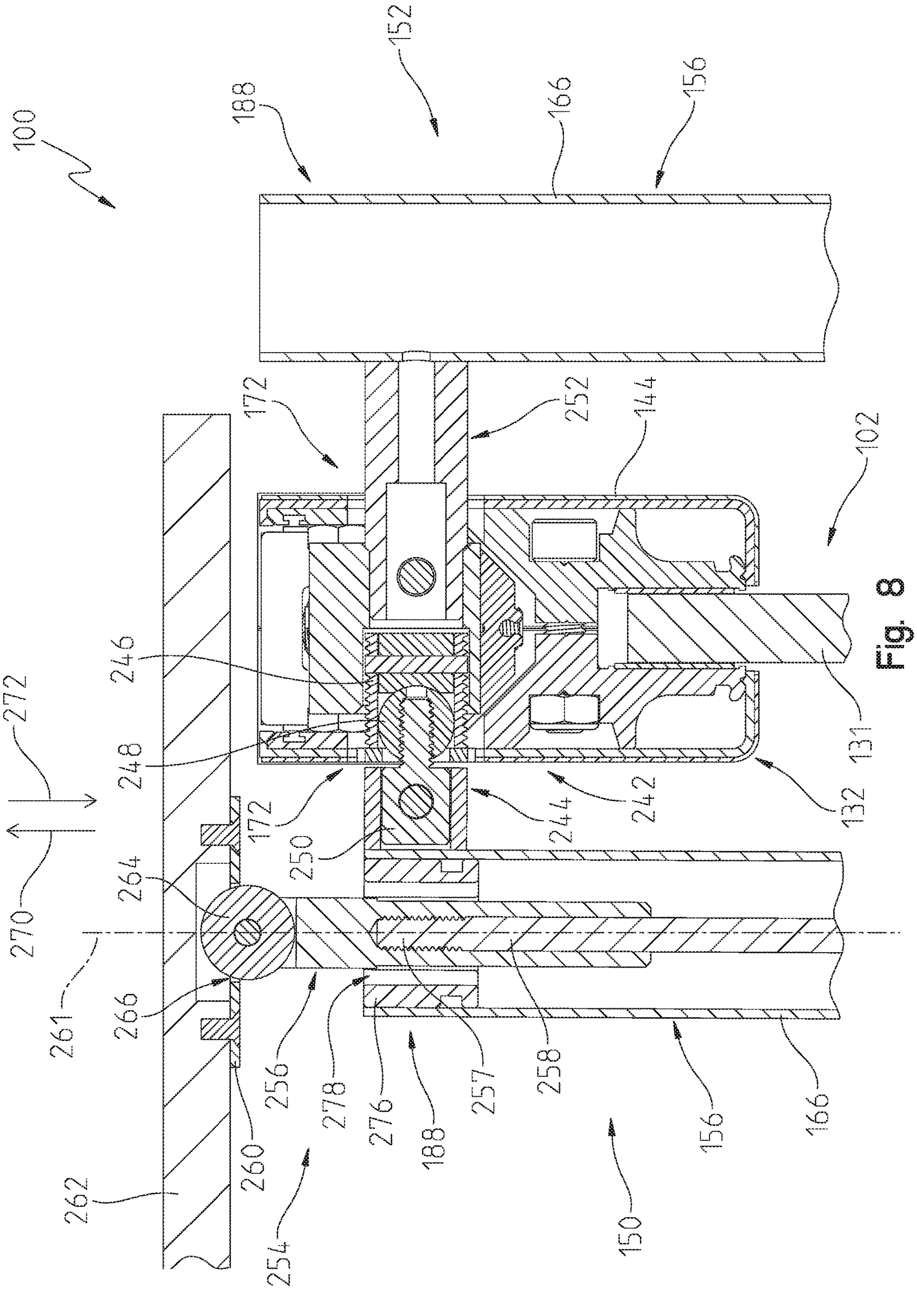
FIG. 8 is a cross-sectional view of a distal end of a vertical section of the exemplary exit device assembly of FIG. 2 taken along lines 8-8 of FIG. 2.

With reference now to FIG. 8, distal end 188 of adjustment tube 156 is shown in more detail. In the first configuration of exit devices 150, 152, distal end 188 of adjustment tube 156 is pivotally coupled to upper rail 144 of door 102 at mounting location 172. More specifically, distal end 188 of adjustment tube 156 includes a pivot assembly 242 having a pivot coupler 244 pivotally supported within a socket 246 coupled to upper rail 144. Pivot coupler 244 illustratively includes a ball joint 248 pivotally supported within socket 246 and threadably coupled to a pin 250. Pin 250 is coupled to distal end 188 of adjustment tube 156. Pivot assembly 242 permits adjustment tube 156 and main tube 154 to pivot relative to mounting location 172 when exit device 150 is actuated towards or away from door 102. Conversely, exit device 152 is fixedly coupled to door 102 at mounting location 172. Distal end 188 of adjustment tube 156 of exit device 152 includes a coupler 252 fixedly coupled to upper rail 144.

Exit device 150 also includes a latchbolt assembly 254. Latchbolt assembly 254 includes a latchbolt 256 coupled to a rod 258, which are selectively moveable along an axis 261 in directions 270, 272 between an extended position (see FIG. 11*a*) and a retracted position (see FIG. 11*b*). Latchbolt 256 is configured to releasably engage a strike or latch plate 260 securely mounted to a stationary member 262 such as, for example, a wall, a ceiling, or a header. Engaging latchbolt 256 with latch plate 260 fixedly couples door 102 relative to stationary member 262. In the exemplary embodiment shown, latchbolt 256 illustratively includes a rotatable wheel 264 configured to be received within an opening 266 of latch plate 260. Rotatable wheel 264 is rotatably coupled to a distal end of latchbolt 256 and assists in directing latchbolt 256 toward opening 266 of latch plate 260 when latchbolt 256 is misaligned with latch plate 260. In other embodiments, latchbolt 256 may comprise, for example, a wheel-less Pullman latch. Latchbolt 256 is threadably coupled to an end 257 of rod 258, which extends axially through an interior of adjustment tube 156 and of main tube 154 to an actuator assembly 268. Distal end 188 of adjustment tube 156 includes a fitting 276 having an aperture 278 through which latchbolt 256 extends. Aperture 278 of fitting 276 is configured to align latchbolt 256 and rod 258 along axis 261. In addition, fitting 276 is rotatable about axis 261 to adjust an extent in which latchbolt 256 extends from distal end 188 of adjustment tube 156. More specifically, latchbolt 256 is rotationally retained by fitting 276. Therefore, when fitting 276 is rotated about axis 261, latchbolt 256 also rotates about axis 261. Because rod 258 is stationary relative to fitting 276 and latchbolt 256 rotating about axis 261, the threaded connection between end 257 of rod 258 and latchbolt 256 will cause latchbolt 256 to move axially along axis 261 when fitting 276 and latchbolt 256 are rotated about axis 261. Accordingly, fitting 276 permits an installer to fine tune the engagement of latchbolt 256 with opening 266 of latch plate 260 during installation of exit device 150.

Figure 9:
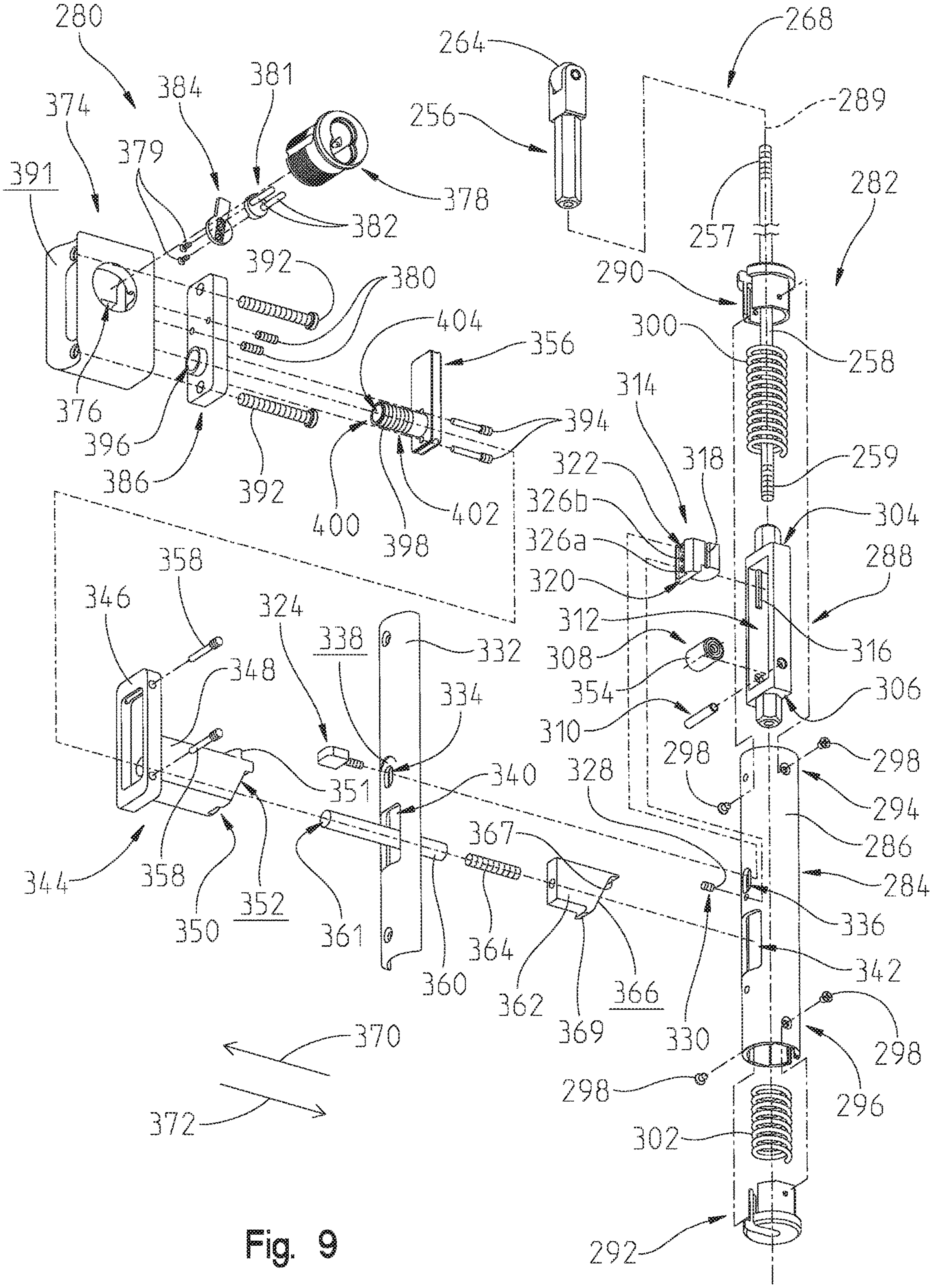
FIG. 9 is an exploded assembly view of an actuator assembly of the exemplary exit device assembly of FIG. 2.

Turning now to FIG. 9, actuator assembly 268 of exit device 150 is illustrated. Actuator assembly 268 includes a lock assembly 280 operatively coupled to a sleeve assembly 282. Sleeve assembly 282 is illustratively housed within an interior of tubular body 160 of main tube 154 and includes a sleeve 284 having a tubular body 286. Sleeve assembly 282 further includes a carriage 288 supported within tubular body 286 of sleeve 284 and threadably coupled to an end 259 of rod 258. Carriage 288 is moveable along an axis 289 in directions 270, 272 (see FIG. 8). In other embodiments, rod 258 may be coupled to carriage 288 without threads. Sleeve 284 further includes end caps 290, 292 coupled to a respective one of ends 294, 296 of tubular body 286. Illustratively, caps 290, 292 are coupled to the respective end using at least one mechanical fastener 298, illustratively a screw. In other embodiments, caps 290, 292 may be coupled to sleeve 284 using, for example, rivets, a mechanical adhesive, thermal bonding, or a mechanical fit therebetween. Carriage 288 is supported axially intermediate ends 294, 296 of tubular body 286 by biasing members 300, 302. More specifically, biasing member 300, illustratively a coil spring, is registered against cap 290 and a shoulder 304 of carriage 288. Biasing member 300 biases carriage 288 away from end 294 of sleeve 284. Similarly, biasing member 302, illustratively a coil spring, is registered against cap 292 and a shoulder 306 of carriage 288. Biasing member 302 biases carriage 288 away from end 296 of sleeve 284. A biasing force of biasing member 302 may be larger than a biasing force of biasing member 300. In other embodiments, biasing members 300, 302 register against a shoulder or flange of tubular body 286 of sleeve 284.

A bearing or roller 308 is rotatably supported on a pin 310 within an elongated channel 312 of carriage 288. In addition, an adjustable stop 314 is supported for displacement within elongated channel 312 of carriage 288. Elongated channel 312 includes a protrusion or ridge 316 that is received within a corresponding channel 318 of adjustable stop 314. As a result, adjustable stop 314 is supported for limited movement along ridge 316 in directions 270, 272. Adjustable stop 314 also includes a protrusion or lip 320, a threaded aperture 322 configured to receive a dogging or finger tab 324, and a plurality of detents 326, illustratively detents 326*a*, 326*b*, configured to releasably engage a springed ball 328. As a result, adjustable stop 314 is moveable between a first position in which ball 328 releasably engages detent 326*a* (see FIG. 11*a*) and a second position in which ball 328 releasably engages detent 326*b* (see FIG. 11*c*). In the exemplary embodiment shown, ball 328 is supported on a distal end of a set screw 330 by a spring (not shown) that assists ball 328 in engaging detents 326*a*, 326*b*. Set screw 330 is threadably engaged with sleeve 284. An advantage, among others, of set screw 330 is that the extent of engagement of set screw 330 with sleeve 284 may be adjusted to vary the amount of engagement of ball 328 with detents 326.

Sleeve assembly 282 also includes a faceplate 332 coupled to an exterior of tubular body 160 of main tube 154. Sleeve 284 is coupled to an interior of tubular body 160 at the same position. As a result, sleeve assembly 282 is axially maintained in a specific position within tubular body 160 of main tube 154 of exit device 150. In the first configuration, sleeve assembly 282 is positioned on vertical portion 178 of main tube 154. Finger tab 324 passes through an elongated slot 334 of faceplate 332 to threadably couple to adjustable stop 314. Elongated slot 334 of faceplate 332 is aligned with a corresponding slot 336 of tubular body 286 of sleeve 284. Finger tab 324 is moveably along an exterior surface 338 of faceplate 332 to position adjustable stop 314 in one of the first and second positions of ball 328 engaging detents 326.

Faceplate 332 also includes an opening 340 aligned with a corresponding opening 342 of tubular body 286 of sleeve 284. Openings 340, 342 are sized to receive an actuator 344 coupled to first side 114 of door 102. Actuator 344 includes a base 346 and a post 348 extending from base 346 to a distal end 350. Base 346 is coupled to an adapter 356 using at least one mechanical fastener 358. In the exemplary embodiment shown, distal end 350 of post 348 comprises a curvilinear surface 352 configured to engage an outer surface 354 of roller 308 of carriage 288. Distal end 350 of post 348 also includes a protrusion 351 configured to engage an inner surface of sleeve 284 of sleeve assembly 282 (see FIG. 11*a*). Sleeve 284 moves relative to actuator 344, which is fixedly coupled to first side 114 of door 102 at mounting location 170, because exit device 150 is pivotally coupled to first side 114 of door 102 at mounting locations 172, 174. Protrusion 351 of actuator 344, therefore, acts as a stop for exit device 150.

Base 346 and post 348 include an internal cavity configured to receive a bolt 360 coupled to a ramp actuator 362 with a threaded rod 364. Ramp actuator 362 includes a curvilinear surface 366 complementary to curvilinear surface 352 of post 348 of actuator 344 and is configured to engage outer surface 354 of roller 308. Curvilinear surface 366 is angled and extends from a lower lip 369 to an upper lip 367. Upper lip 367 of ramp actuator 362 extends distally further than lower lip 369, which is configured to engage distal end 350 of post 348 of actuator 344. Bolt 360 and ramp actuator 362 are axially moveable in directions 370, 372 between a retracted position in which curvilinear surface 366 of ramp actuator 362 does not extend distally from curvilinear surface 352 of post 348 of actuator 344 (see FIG. 11*a*) and an extended position in which curvilinear surface 366 is distally extended from distal end 350 of post 348 (see FIG. 11*d*). In the retracted position, curvilinear surface 366 of ramp actuator 362 may be aligned with or recessed relative to curvilinear surface 352 of post 348 of actuator 344. Threaded rod 364 may be used to adjust the amount of spacing between bolt 360 and ramp actuator 362 to configure the alignment of ramp actuator 362 with curvilinear surface 352 of distal end 350 of post 348 of actuator 344 in the first position and a distance from distal end 350 of post 348 that curvilinear surface 366 distally extends in the second position.

Figure 10A:
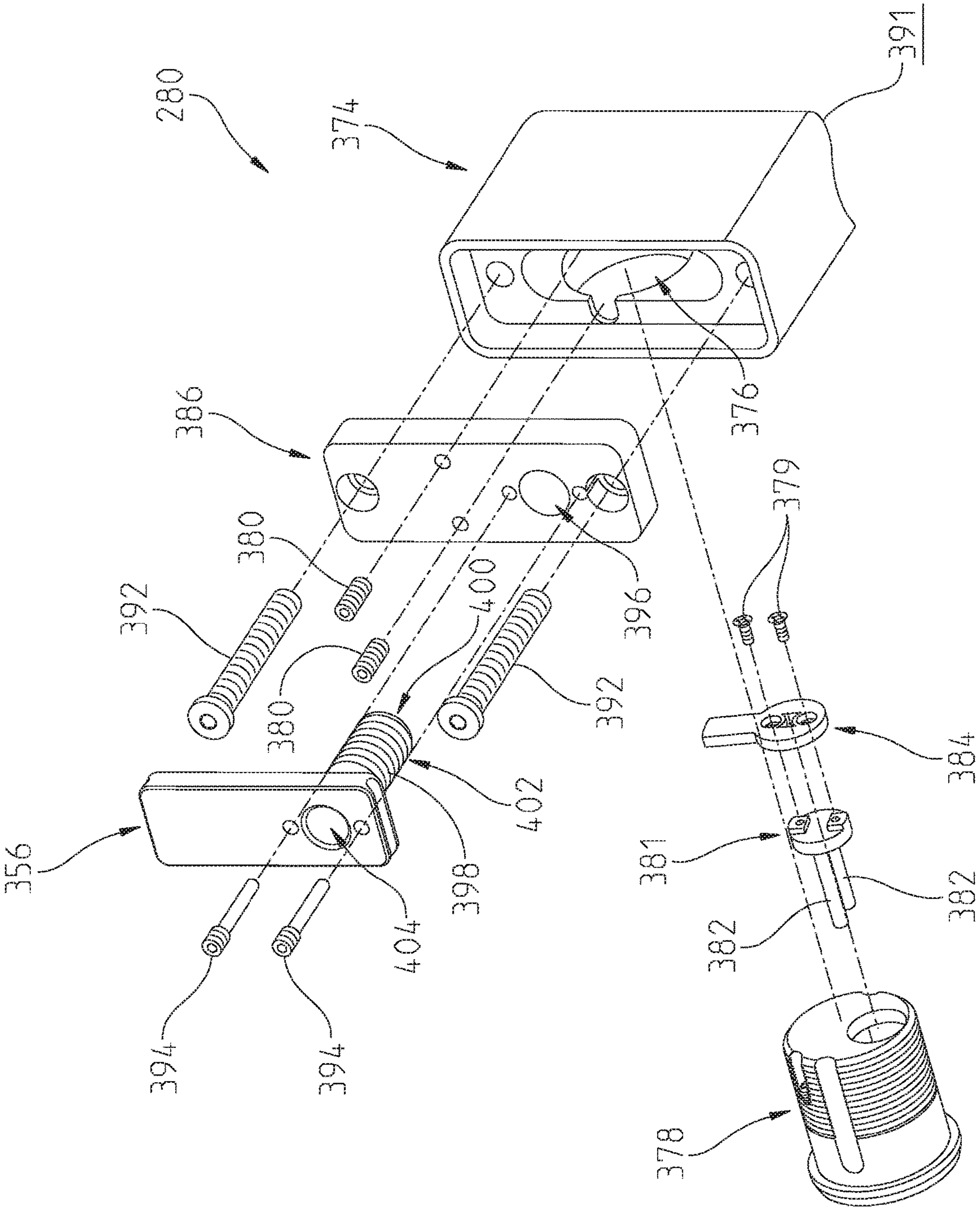
FIG. 10*a* is an exploded assembly view of a lock assembly of the exemplary exit device assembly of FIG. 2 configured to mount to the door.

Referring now to both FIGS. 9 and 10*a*, lock assembly 280 of exit device 150 is shown in more detail. In the exemplary embodiment shown, lock assembly 280 is fixedly coupled to door 102 at mounting location 170 (see FIG. 11*a*). Lock assembly 280 includes a housing 374 fixedly coupled to adapter 356. Housing 374 includes an opening 376 configured to receive a lock cylinder 378. Housing 374 supports lock cylinder 378 in an installed position using at least one mechanical fastener 380. In the exemplary embodiment shown, lock cylinder 378 is oriented perpendicular to actuator 344 when in the installed position. Lock cylinder 378 includes an opening configured to receive an interchangeable lock core such as, for example, a small format interchangeable core ("SFIC"). In one embodiment, the interchangeable lock core may include a keyway configured to receive a key blade for transitioning lock assembly 280 from a locked configuration (see FIG. 11*a*) to an unlocked configuration (see FIG. 11*d*). In embodiments, a wireless lock core is provided for transitioning lock core assembly 280 from the locked configuration to the unlocked configuration. Additional details of an exemplary wireless lock core are provided in PCT Published Application WO2019/051337, titled ELECTRO-MECHANICAL LOCK CORE, the entire disclosure of which is expressly incorporated by reference herein. In other embodiments, the interchangeable lock core may be a large format interchangeable core ("LFIC"), a mortise lock core, an oval lock core, a Euro profile lock core, or another known core.

In the exemplary embodiment shown, the interchangeable lock core includes a lock interface in the form of a plurality of recesses that receive a respective one of lock pins 382 of a tailpiece 381 when the interchangeable lock core is installed in lock cylinder 378. Lock pins 382 are in turn coupled to a drive member 384, illustratively a cam, of lock cylinder 378 using at least one mechanical fastener 379. In other embodiments, drive member 384 may be integrally formed with lock pins 382. Drive member 384 is selectively rotatable between a first position that corresponds to lock assembly 280 in the locked configuration and a second position that corresponds to lock assembly 280 in the unlocked configuration. When drive member 384 is selectively rotated from the first position to the second position in a direction 388 (see FIG. 11*d*), drive member 384 engages an end 361 of bolt 360 to axially displace bolt 360 in direction 372 and, in turn, axially displace ramp actuator 362 from the retracted position to the extended position (see FIG. 11*d*). The interchangeable lock core or lock cylinder 378 may bias drive member 384 in a direction 390 (see FIG. 11*d*) to return drive member 384 to the first position from the second position. In other embodiments, drive member 384 may be selectively maintained in the second position.

Figure 11A:
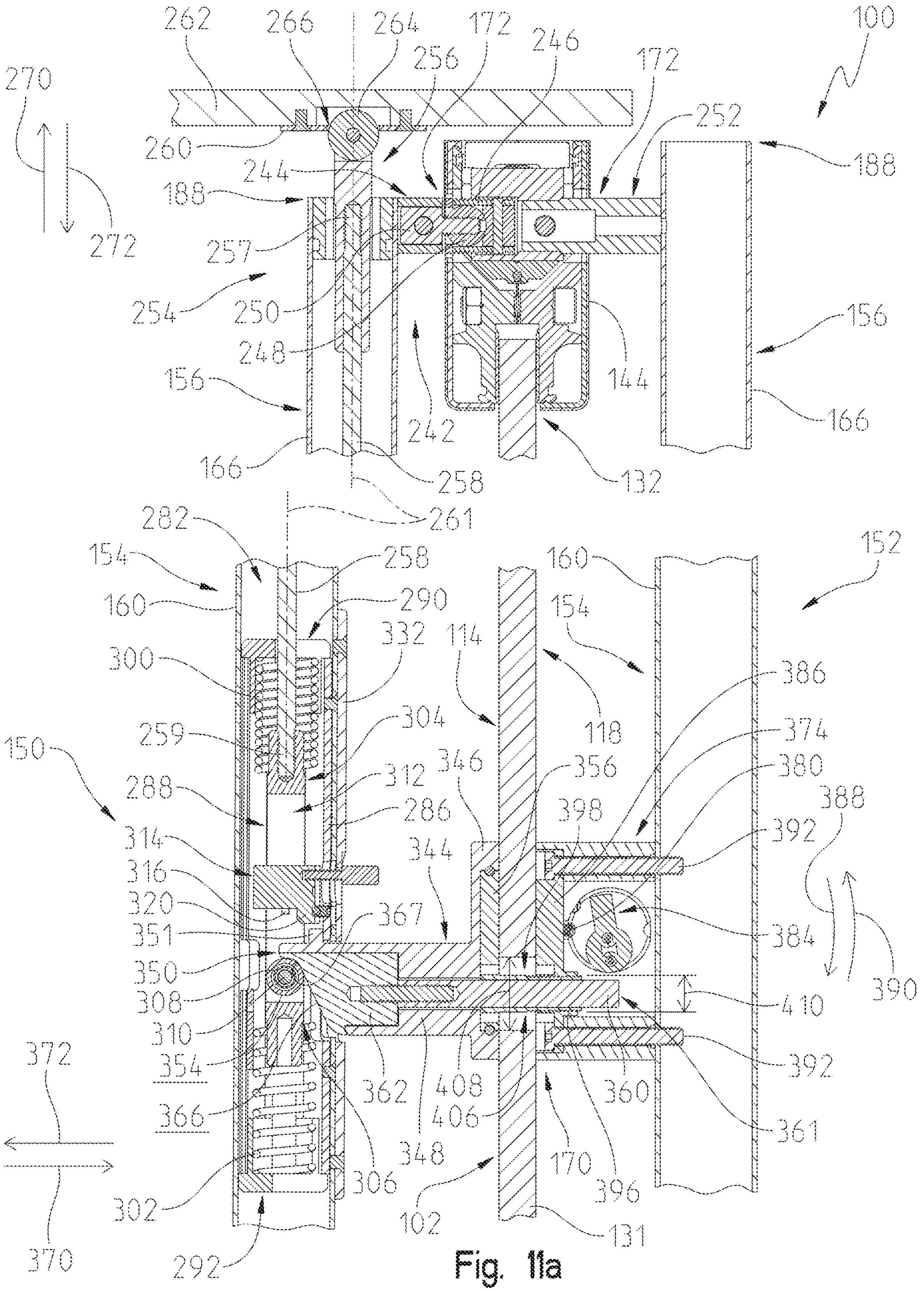
FIG. 11*a* is a cross-sectional view of the exemplary exit device assembly of FIG. 2 in a latched position.

Referring now to FIGS. 9, 10*a*, and 11*a*, lock assembly 280 is fixedly coupled to door 102 at mounting location 170 (see FIG. 11*a*). Exit device 152 is coupled to housing 374 of lock assembly 280 using at least one mechanical fastener 392, illustratively a screw. Fastener 392 is supported by a mounting member 386 of housing 374 and passes through housing 374 to threadably couple housing 374 to tubular body 160 of main tube 154 of exit device 152. In turn, mounting member 386 is coupled to adapter 356. Lock assembly 280 includes a plurality of fasteners, illustratively threaded pins 394, that maintain alignment of adapter 356 relative to mounting member 386 when lock assembly 280 is fixedly coupled to door 102 at mounting location 170. More specifically, threaded pins 394 extend through door 102 to rotationally fix adapter 356 relative to mounting member 386. Mounting member 386 includes an aperture 396 adapted to receive a post 398 extending from adapter 356. A distal portion 400 of post 398 includes engagement features 402, illustratively threads, for coupling adapter 356 to aperture 396 of mounting member 386. Post 398 also includes a passageway 404 extending therethrough. Post 398 is sized to receive bolt 360. In the exemplary embodiment show, housing 374 includes a surface 391 complementary to tubular body 160 of main tube 154 of exit device 152.

Adapter 356 is positioned on first side 114 of door 102, and mounting member 386 is positioned on second side 118 of door 102. Door 102, therefore, is sandwiched between adapter 356 and mounting member 386 of lock assembly 280. As such, post 398 extends from adapter 356 to mounting member 386 through an aperture 406 in door 102 at mounting location 170. Aperture 406 illustratively extends through body 131 from first side 114 to second side 118. In the exemplary embodiment shown, aperture 406 comprises a circle having a center and a diameter 408 sized to receive post 398 of adapter 356 and allow for movement of post 398 within aperture 406. That is, diameter 408 is larger than an outer diameter 410 of post 398 of adapter 356.

Moreover, circular aperture 406 has an infinite number of axes of symmetry defined by diameter 408. In other embodiments, aperture 406 has at least one axis of symmetry such as, for example, an ellipse or oval. An advantage, among others, of aperture 406 is that only a single aperture needs to be machined in door 102 at mounting location 170 rather than a plurality of overlapping, nonaligned apertures. As a result, an overall cost of producing door 102 is reduced, especially when body 131 of door 102 comprises glass which requires a post-manufacturing process to machine aperture 406. In addition, engagement features 402 of post 398 of adapter 356 allow a distance between adapter 356 and mounting member 386 to be adjusted for a range of thicknesses of body 131 of door 102. Lock assembly 280 may be mounted to door 102 using one or more gasket or sealing member between side 114 of door 102 and adapter 356 and actuator 344 and between side 118 of door 102 and mounting member 386. In other embodiments, lock assembly 280 is not coupled to an exit device on second side 118 of door 102.

Figure 10B:
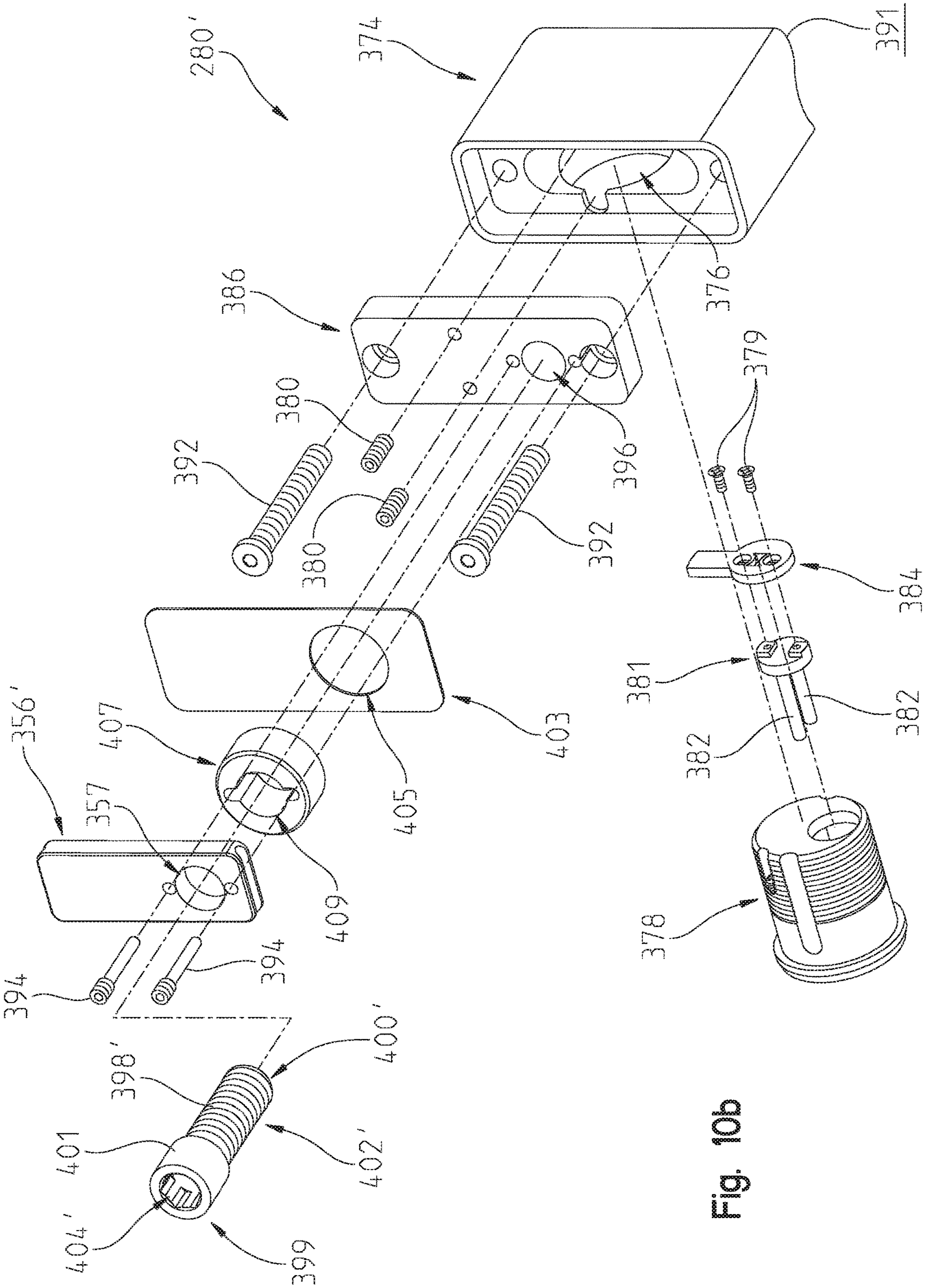
FIG. 10*b* is an exploded assembly view of an alternative lock assembly configured to mount to the door.

Referring now to FIG. 10*b*, an alternative mounting method of an alternative lock assembly 280' is shown. Because lock assembly 280' is similar to lock assembly 280, reference characters in lock assembly 280' correspond to the same or similar lock reference characters in lock assembly 280. More specifically, lock assembly 280' includes housing 374 fixedly coupled to a mounting adapter 356'. As discussed above in connection with lock assembly 280, housing 374 includes opening 376 configured to receive lock cylinder 378 in the installed position using at least one mechanical fastener 280. Lock cylinder 378 is illustratively oriented perpendicular to actuator 344 when in the installed position. Lock cylinder 378 includes an opening configured to receive an interchangeable lock core such as, for example, SFIC. The lock core may include a keyway configured to receive a key blade for transition lock assembly 280' from a locked configured (see lock assembly 280 in FIG. 11*a*) to an unlocked configuration (see lock assembly 280 in FIG. 11*d*). In embodiments, a wireless lock core is provided for transition lock core assembly 280' from the locked configuration to the unlocked configuration. In other embodiments, the interchangeable lock core may be an LFIC, a mortise lock core, an oval lock core, a Euro profile lock core, or another known core.

In the exemplary embodiment shown, the interchangeable lock core includes a lock interface in the form of a plurality of recesses that receive a respective one of lock pins 382 of tailpiece 381 when the interchangeable lock core is installed in lock cylinder 378. Lock pins 382 are in turn coupled to drive member 384, illustratively a cam, of lock cylinder 378 using at least one mechanical fastener 379. In other embodiments, drive member 384 may be integrally formed with lock pins 382. Drive member 384 is selectively rotatable between a first position that corresponds to lock assembly 280' in the locked configuration and a second position that corresponds to lock assembly 280' in the unlocked configuration. When drive member 384 is selectively rotated from the first position to the second position in direction 388 (see FIG. 11*d*), drive member 384 engages an end 361 of bolt 360 to axially displace bolt 360 in direction 372 and, in turn, axially displace ramp actuator 362 from the retracted position to the extended position (see FIG. 11*d*). The interchangeable lock core or lock cylinder 378 may bias drive member 384 in a direction 390 (see FIG. 11*d*) to return drive member 384 to the first position from the second position. In other embodiments, drive member 384 may be selectively maintained in the second position.

When lock assembly 280' is fixedly coupled to door 102 at mounting location 170, exit device 152 is coupled to housing 374 of lock assembly 280' using at least one mechanical fastener 392, illustratively a screw. Fastener 392 is supported by a mounting member 386 of housing 374 and passes through housing 374 to threadably couple housing 374 to tubular body 160 of main tube 154 of exit device 152. In turn, mounting member 386 is coupled to a post 398', illustratively a threaded fastener, to couple housing 374 to a mounting adapter 356' positioned on first side 114 of door 102. Mounting adapter 356' includes an opening 357 through which post 398' passes. Post 398' includes a proximate portion 399 having a head 401 larger than opening 357 of adapter 356'. In this way, head 401 of post 398' engages mounting adapter 356' when coupled to mounting member 386. Post 398' also includes a passageway 404' extending therethrough. A portion of passageway 404' proximate head 401 of post 398' includes engagement features for receiving and engaging with a tool (not shown) for threadably engaging mounting member 386. A distal portion 400' of post 398' includes engagement features 402', illustratively threads, for coupling adapter 356' to aperture 396 of mounting member 386. Passageway 404' is sized to receive bolt 360.

Adapter 356' is positioned on first side 114 of door 102, and mounting member 386 is positioned on second side 118 of door 102. Door 102, therefore, is sandwiched between adapter 356' and mounting member 386. Lock assembly 280' includes a plurality of fasteners, illustratively threaded pins 394, that maintain alignment of adapter 356' relative to mounting member 386 when lock assembly 280' is fixedly coupled to door 102 at mounting location 170. Threaded pins 394 extend through door 102 to rotationally fix adapter 356' relative to mounting member 386. Housing 374 also includes a surface 391 complementary to tubular body 160 of main tube 154 of exit device 152.

In the exemplary embodiment shown, lock assembly 280' also includes a gasket 403, which is positioned against second side 118 of door 102. Gasket 403 includes an opening 405 sized to receive and allow post 398' and bolt 360 to pass therethrough. Lock assembly 280' further includes a fitting 407 received within aperture 406 of door 102 at mounting location 170. Accordingly, diameter 408 of aperture 406 will be sized to receive fitting 407 when lock assembly 280' is mounted to door 102. Fitting 407 also includes an opening 409 sized to receive and allow post 398', bolt 360, and fasteners 394 to pass therethrough. Fitting 407 assists in centering and aligning adapter 456' and mounting member 386 relative to one another and aperture 406 of door 102. Another advantage, among others, is that fitting 407 keeps post 398' and bolt 360 from striking the boundaries of aperture 406 of door 102 during installation and operation of lock assembly 280'.

With reference now to FIGS. 11*a*-11*d*, the operation of exit device assembly 100 is shown in more detail. While the operation of exit device assembly 100 is explained with reference to lock assembly 280, it is understood that exit device assembly 100 operates in the same manner when lock assembly 280' is used. As discussed above, exit device 152 is fixedly coupled to second side 118 of door 102. Exit device 150, however, is pivotally coupled to first side 114 of door 102 and moveable in directions 370, 372 between a rest state and an actuated state.

Referring initially to FIG. 11*a*, exit device 150 is shown in the rest state, which corresponds to exit device assembly 100 in a latched position. When exit device 150 is in the rest state, main tube 154 of exit device 150 is positioned at a furthest point away from first side 114 of door 102 in direction 372, and protrusion 351 of actuator 344 has engaged the inner surface of tubular body 286 of sleeve 284. In addition, latchbolt 256 is fully extended in direction 270 along axis 261 to the extended position in which rotatable wheel 264 releasably engages latch plate 260 of stationary member 262. Further, a force in direction 370, for example a pull, applied to exit device 152 will not cause exit device 150 to be actuated nor latchbolt 256 to be retracted. Therefore, door 102 is secured relative to stationary member 262 when exit device 150 is in the rest state. In the exemplary embodiment shown, actuator assembly 268 biases exit device 150 to the rest state.

The movement of exit device 150 in direction 372 relative to actuator 344 and adapter 356 in direction 270 is initiated by biasing member 302 and the engagement of roller 308 with curvilinear surface 366 of ramp actuator 362 and curvilinear surface 352 of post 348 of actuator 344. More specifically, the biasing force applied by biasing member 302 against carriage 288 biases carriage 288 in direction 270 and compresses biasing member 300. The movement of carriage 288 in direction 270 results in roller 308 rolling against curvilinear surface 366 of ramp actuator 362. Because curvilinear surface 366 of ramp actuator 362 is angled, roller 308 and carriage 288 are also displaced in direction 372 as biasing member 302 biases carriage 288 in direction 270. This displacement continues until protrusion 351 of actuator 344 engages the inner surface of mounting member 386 of sleeve 284. Protrusion 351, therefore, acts as a stop for the displacement of exit device 150 in direction 372. Lower lip 369 of ramp actuator 362 also acts as a stop for roller 308 in direction 270. In the exemplary embodiment shown, exit device 150 naturally returns to the rest state.

Figure 11B:
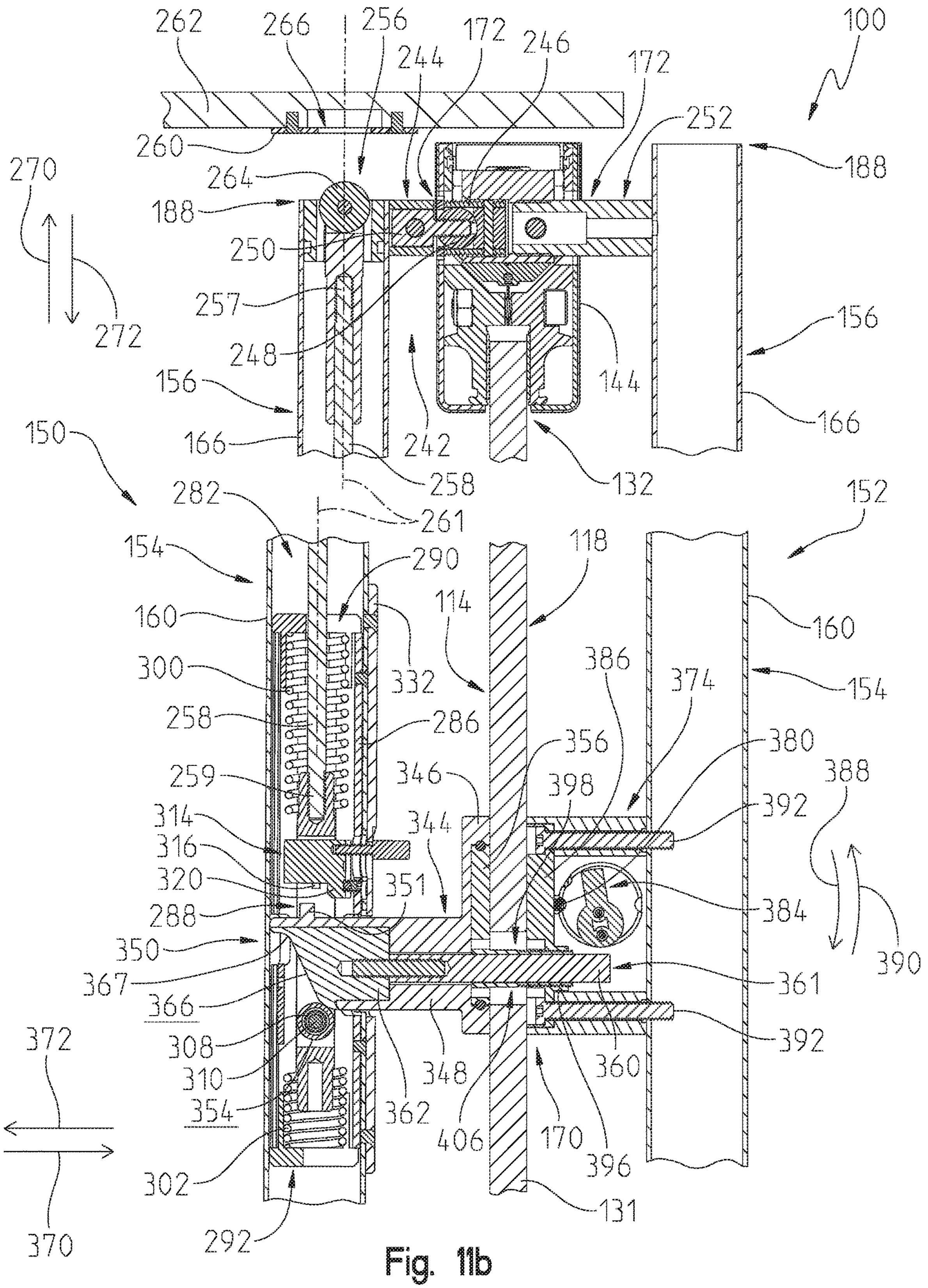
FIG. 11*b* is a cross-sectional view of the exemplary exit device assembly of FIG. 2 in an unlatched position.

Referring now to FIG. 11*b*, exit device 150 is shown in an actuated state, which corresponds to exit device assembly 100 in an unlatched position. When exit device 150 is in the actuated state, a force in direction 370, for example a push, has been applied to exit device 150 to move exit device 150 in direction 370 from the rest state. In the actuated state shown in FIG. 11*b*, main tube 154 of exit device 150 is positioned at the closest point to first side 114 of door 102 in direction 370, and distal end 350 of actuator 344 has engaged an inner surface of tubular body 160 of main tube 154. In addition, latchbolt 256 is fully retracted in direction 272 along axis 261 to the retracted position in which rotatable wheel 264 does not releasably engage stationary member 262. Therefore, door 102 is moveable relative to stationary member 262 when exit device 150 is in the actuated state.

When the force in direction 370 is applied to exit device 150, roller 308 rolls against curvilinear surface 366 of ramp actuator 362. Because slot 336 of ramp actuator 362 is angled, roller 308 and carriage 288 are displaced in direction 272 and direction 370. Displacement of carriage 288 in direction 272 compresses biasing member 302 and retracts rod 258 along axis 261. The displacement of carriage 288 in direction 272 due to the application of force in direction 370 continues until distal end 350 of actuator 344 engages an inner surface of tubular body 160 of main tube 154. Carriage 288 is sufficiently displaced in direction 272 such that roller 308 is adjacent lower lip 369 of curvilinear surface 366 of lower lip 369 when exit device 150 is in the actuated state illustrated in FIG. 11*b*. In the exemplary embodiment shown, exit device 150 will remain in the actuated state so long as the force in direction 370 is applied to exit device 150. When the force in direction 370 is removed from exit device 150, biasing member 302 biases carriage 288 in direction 270 to return exit device 150 toward the rest state shown in FIG. 11*a*. Exit device 150 will also remain in an actuated state intermediate the rest state shown in FIG. 11*a* and the actuated state shown in FIG. 11*b* even if a force is no longer applied to exit device 150 in direction 370 so long as rotatable wheel 264 of latchbolt 256 has not releasably engaged opening 266 of latch plate 260, such as when door 102 is not in the closed position.

Figure 11C:
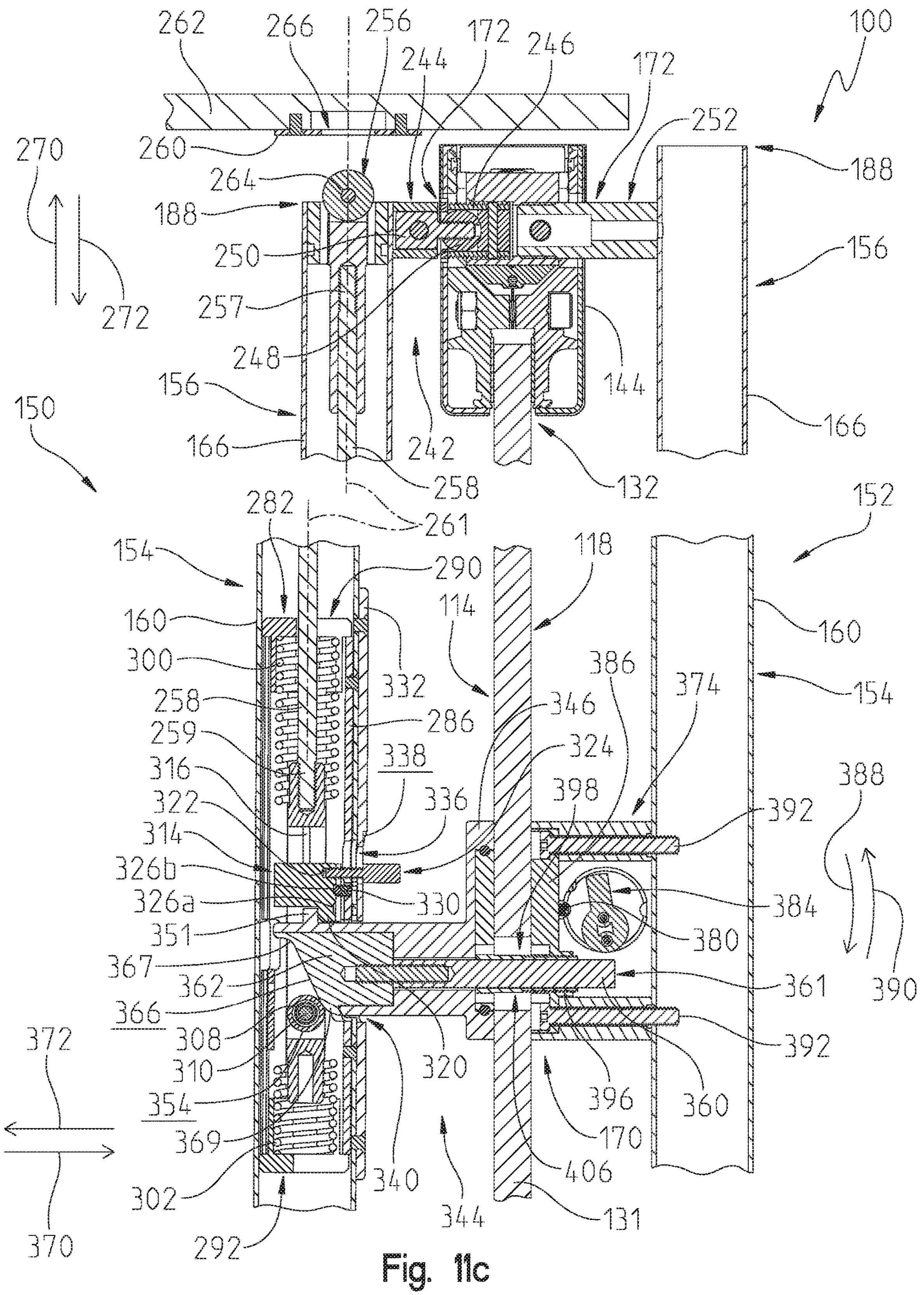
FIG. 11*c* is a cross-sectional view of the exemplary exit device assembly of FIG. 2 in a maintained unlatched position.

Referring now to FIG. 11*c*, exit device 150 is shown in a selectively maintained actuated state, which corresponds to exit device assembly 100 in the unlatched position. From the actuated state of exit device 150 shown in FIG. 11*b*, finger tab 324 is moved along exterior surface 338 of faceplate 332 to displace adjustable stop 314 in direction 272 from the first position to the second position in which ball 328 releasably engages detent 326*b*. The spring supporting ball 328 biases ball 328 against detent 326*b*, which releasably secures adjustable stop 314 in the second position. In the second position, lip 320 of adjustable stop 314 is positioned intermediate protrusion 351 of actuator 344 and an inner surface of tubular body 286 of sleeve 284.

When the force in direction 370 is removed from exit device 150 and biasing member 302 biases carriage 288 in direction 270 to return exit device 150 toward the rest state, lip 320 of adjustable stop 314 engages protrusion 351 of actuator 344 and prevents main tube 154 of exit device 150 from moving any further in direction 372. In addition, carriage 288 and latchbolt 256 are prevented from moving in direction 270. Latchbolt 256 is positioned intermediate the retracted and extended positions and is insufficiently extended along axis 261 to releasably engage latch plate 260. Door 102, therefore, is moveable relative to stationary member 262, and a force applied in direction 370 to exit device 152 will now transition door 102 from the closed position to the opened position.

An advantage, among others, of the selectively maintained actuated state of exit device 150 is that latchbolt 256 of exit device 150 may be selectively "locked" in the retracted and unlatched position for situations in which repeated actuations of exit device 150 or repeated opening and closing of door 102 are anticipated. To return exit device 150 from the selectively maintained actuated state to the actuated state of FIG. 11*b*, a force in direction 370 is applied to exit device 150 to disengage protrusion 351 of actuator 344 and lip 320 of adjustable stop 314. Once disengaged, finger tab 324 may be moved along exterior surface 338 of faceplate 332 to displace adjustable stop 314 in direction 270 to the first position in which ball 328 releasably engages detent 326*a*. The spring supporting ball 328 biases ball 328 against detent 326*a*, which releasably secures adjustable stop 314 in the first position. Removing the force in direction 370 from exit device 150 will result in exit device 150 returning to the rest state shown in FIG. 11*a* so long as latchbolt 256 is aligned with opening 266 of latch plate 260.

Figure 11D:
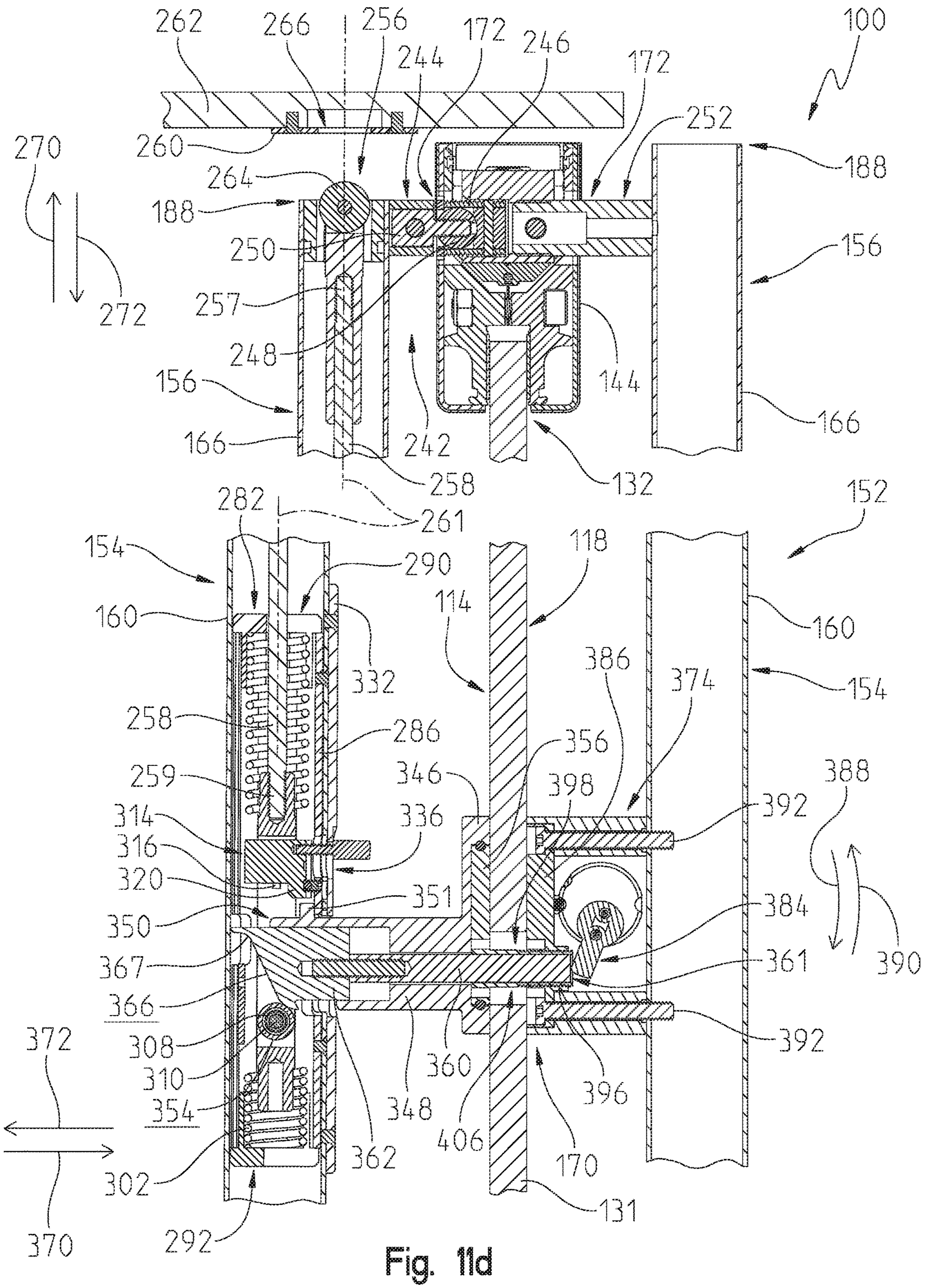
FIG. 11*d* is a cross-sectional view of the exemplary exit device assembly of FIG. 2 in an unlocked and unlatched position.

Referring now to FIG. 11*d*, exit device 150 is shown in an unlocked state, which corresponds to exit device assembly 100 in an unlocked and unlatched position. When exit device 150 is in the rest state shown in FIG. 11*a*, access from second side 118 of door 102 via exit device 152 may be desirable. Accordingly, drive member 384 of lock assembly 280 is rotated in direction 388 from the first position to the second position to engage end 361 of bolt 360 and displace bolt 360 in direction 372. The displacement of bolt 360 in direction 372 results in displacement of ramp actuator 362 in direction 372 from the retracted position to the extended position which ramp actuator 362 distally extends from distal end 350 of post 348. The displacement of ramp actuator 362 in direction 372 will continue until upper lip 367 of ramp actuator 362 engages an inner surface of tubular body 160 of main tube 154 of exit device 150.

Displacing ramp actuator 362 in direction 372 creates relative motion between ramp actuator 362 and roller 308 similar to the relative motion created when a force in direction 370 is applied to exit device 150. That is, ramp actuator 362 displaces carriage 288 in direction 272, which compresses biasing member 302. The displacement of carriage 288 in direction 272 retracts latchbolt 256 along axis 261 from the extended position to the retracted position. Latchbolt 256, therefore, is disengaged from latch plate 260 and door 102 is moveable relative to stationary member 262. In some embodiments, drive member 384 is selectively rotated in direction 388 via a key blade inserted into a keyway of the interchangeable lock core supported with lock cylinder 378 of lock assembly 280. In other embodiments, drive member 384 is selectively rotated in direction 388 via an electro-mechanical lock core following an acceptable input.

Exit device 150 will remain in the unlocked state so long as sleeve 284 remains in the second position. In some embodiments, exit device 150 may be selectively retained in the unlocked state to permit repeated opening and closing of door 102. Once sleeve 284 is rotated in direction 390 from the second position toward the first position, biasing member 302 will bias carriage 288 in direction 270 to return exit device 150 to the rest state. In other embodiments, lock assembly 280 may bias sleeve 284 in direction 390 from the second position to the first position.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An exit device for coupling to a door having a first side, comprising:

- a main tube extending from a first end to a second end and comprising a first plurality of engagement features, the main tube moveable towards the first side of the door between a rest state and an actuated state;
- a first adjustment tube coupled to the first end of the main tube and comprising a second plurality of engagement features, the first adjustment tube axially adjustable relative to the main tube along a first adjustment axis which extends longitudinally through the main tube and the first adjustment tube;
- an actuator assembly supported by the main tube, the actuator assembly including an actuator adapted to fixedly couple to the first side of the door, the actuator including a distal end having a curvilinear surface, the curvilinear surface is angled relative to the first adjustment axis of the first adjustment tube, and the actuator assembly including a carriage supporting a roller engaged with the curvilinear surface of the actuator, the roller engaging a first portion of the curvilinear surface when the main tube is in the rest state and the roller engaging a second portion of the curvilinear surface when the main tube is in the actuated state, the carriage only translating linearly along an axis parallel to the first adjustment axis of the first adjustment tube when the main tube moves from the rest state to the actuated state; and
- a latchbolt coupled to the actuator assembly and moveable between a retracted position and an extended position in which an end of the latchbolt is spaced apart from a distal end of the first adjustment tube, the latchbolt configured to engage a latch;
- wherein the first plurality of engagement features and the second plurality of engagement features cooperate to set an overall length of the main tube and the first adjustment tube; and
- wherein the first plurality of engagement features and the second plurality of engagement features are closer to the first adjustment axis than both an exterior of the main tube and an exterior of the first adjustment tube.

2. The exit device of claim 1, wherein the latchbolt is in the extended position when the main tube is in the rest state, and the latchbolt is in the retracted position when the main tube is in the actuated state.

3. The exit device of claim 1, wherein the first adjustment tube is axially adjustable relative to the main tube between an inserted position and an extended position.

4. The exit device of claim 3, wherein an end of the first adjustment tube opposite the distal end includes the second plurality of engagement features.

5. The exit device of claim 1, wherein the first adjustment tube is received within an interior of the first end of the main tube, the first adjustment tube axially adjustable relative to the main tube to vary an amount of overlap of the first end of the main tube and the first adjustment tube.

6. The exit device of claim 1, further comprising a second adjustment tube coupled to the second end of the main tube, the second adjustment tube axially adjustable relative to the main tube along a second adjustment axis.

7. The exit device of claim 6, wherein the second adjustment axis is perpendicular to the first adjustment axis.

8. The exit device of claim 1, wherein a portion of the actuator assembly is supported within an interior of the main tube.

9. The exit device of claim 8, wherein the portion of the actuator assembly includes a sleeve assembly, the sleeve assembly operatively coupled to the actuator.

10. The exit device of claim 1, wherein when the latchbolt is in the retracted position, the end of the latchbolt is at least partially housed within an interior of the first adjustment tube.

11. The exit device of claim 1, wherein the first end of the main tube is angled relative to the second end of the main tube.

12. The exit device of claim 1, wherein the carriage is moveable along a carriage movement axis in a first direction and a second direction opposite the first direction, the carriage moveable along the carriage movement axis between a first position and a second position; and wherein the actuator assembly further comprises a biasing member supported by the carriage and providing a biasing force against the carriage in the first direction.

13. The exit device of claim 12, wherein the actuator is moveable between a retracted position and an extended position, wherein when the actuator is in the retracted position, the carriage is in the first position, and when the actuator is in the extended position, the carriage is in the second position and the biasing member is compressed.

14. The exit device of claim 12, wherein the latchbolt is coupled to the carriage opposite the biasing member.

15. The exit device of claim 1, wherein the actuator assembly further comprises an adjustable stop selectively engageable with the actuator to maintain the main tube in the actuated state.

16. An exit device assembly for coupling to a door having a first side opposite a second side, comprising:

a drive member positioned on the first side of the door and moveable between a first position and a second position;

a main tube extending from a first end to a second end and comprising a first plurality of engagement features;

a first adjustment tube coupled to the first end of the main tube and comprising a second plurality of engagement features, the first adjustment tube axially adjustable relative to the main tube along a first adjustment axis which extends longitudinally through the main tube and the first adjustment tube; and an actuator assembly supported by the main tube, the actuator assembly including an actuator positioned on the second side of the door and operatively coupled to the drive member through a circular aperture of the door, the actuator including a distal end having a curvilinear surface, the curvilinear surface is angled relative to the first adjustment axis of the first adjustment tube, wherein the actuator is moveable between a retracted position corresponding to the drive member in the first position and an extended position corresponding to the drive member in the second position;

wherein the actuator assembly further includes a carriage supporting a roller engaged with the curvilinear surface of the actuator, the roller engaging a first portion of the curvilinear surface when the actuator is in the retracted position and the roller engaging a second portion of the curvilinear surface when the actuator is in the extended position, the actuator assembly further includes a first biasing member supported by the carriage and configured to bias the carriage in a first direction parallel to the first adjustment axis of the first adjustment tube, and a second biasing member supported by the carriage and configured to bias the carriage in a second direction parallel to the first adjustment axis of the first adjustment tube, the second direction opposite of the first direction;

wherein the first plurality of engagement features and the second plurality of engagement features cooperate to set an overall length of the main tube and the first adjustment tube; and wherein the first plurality of engagement features and the second plurality of engagement features are closer to the first adjustment axis than both an exterior of the main tube and an exterior of the first adjustment tube.

17. The exit device assembly of claim 16, further comprising a housing positioned on the first side of the door, the housing supporting the drive member.

18. The exit device assembly of claim 17, further comprising a lock core supported by the housing and drivingly coupled to the drive member to selectively transition the drive member from the first position to the second position.

19. The exit device assembly of claim 18, wherein the drive member comprises a cam.

20. The exit device assembly of claim 18, wherein the lock core is oriented perpendicular to the actuator.

21. The exit device assembly of claim 17, further comprising a bolt coupled to the actuator and extending through the aperture of the door, the bolt engageable by the drive member to transition the actuator from the retracted position to the extended position.

22. The exit device assembly of claim 17, further comprising a second main tube fixedly coupled to the first side of the door and the housing.

23. The exit device assembly of claim 16, further comprising:

a mounting member supporting the drive member and positioned adjacent the first side of the door; and an adapter supporting the actuator and positioned adjacent the second side of the door, the adapter coupled to the mounting member only through the aperture in the door.

24. The exit device assembly of claim 23, further comprising a post extending from the adapter through the aperture in the door, the post coupled to the mounting member.

25. The exit device assembly of claim 16, wherein the actuator assembly further comprises an adjustable stop selectively engageable with the actuator.

26. A method of installing an exit device assembly, comprising:

providing a door having a first side opposite a second side;

providing an exit device comprising:

a main tube extending from a first end to a second end and comprising a first plurality of engagement features;

a first adjustment tube coupled to the first end of the main tube and comprising a second plurality of engagement features, the first adjustment tube axially adjustable relative to the main tube along a first adjustment axis which extends longitudinally through the main tube and the first adjustment tube; and an actuator assembly supported by the main tube, the actuator assembly including an actuator with a distal end having a curvilinear surface, the curvilinear surface is angled relative to the first adjustment axis of the first adjustment tube, the actuator assembly further including a carriage supporting a roller engaged with the curvilinear surface of the actuator;

machining a circular aperture in the door, the circular aperture extending from the first side to the second side;

positioning a drive member on the first side of the door, the drive member moveable between a first position and a second position, positioning the actuator on the second side of the door, the actuator moveable between a retracted position and an extended position, wherein the roller engages a first portion of the curvilinear surface when the actuator is in the retracted position and the roller engages a second portion of the curvilinear surface when the actuator is in the extended position, the carriage of the actuator assembly only translating linearly along an axis parallel to the first adjustment axis of the first adjustment tube when the actuator moves from the retracted position to the extended position;

operatively coupling the drive member to the actuator only through the aperture in the door; and axially adjusting the first adjustment tube along the first adjustment axis relative to the main tube of the exit device;

wherein the first plurality of engagement features and the second plurality of engagement features cooperate to set an overall length of the main tube and the first adjustment tube; and wherein the first plurality of engagement features and the second plurality of engagement features are closer to the first adjustment axis than both an exterior of the main tube and an exterior of the first adjustment tube.

27. The method of claim 26, further comprising mounting the main tube of the exit device at a first one of a plurality of mounting locations on the door.

28. The method of claim 27, further comprising mounting the first adjustment tube at a second one of the plurality of mounting locations on the door.

29. The method of claim 28, further comprising providing a second adjustment tube coupled to the second end of the main tube of the exit device.

30. The method of claim 29, further comprising:

axially adjusting the second adjustment tube along a second adjustment axis relative to the main tube of the exit device; and mounting the second adjustment tube at a third one of the plurality of mounting locations.

* * * * *